(12) United States Patent
Herga et al.

(10) Patent No.: US 11,503,443 B2
(45) Date of Patent: Nov. 15, 2022

(54) SYSTEM AND METHOD FOR PROVIDING MARINE CONNECTIVITY

(71) Applicant: Honda Motor Co., Ltd., Tokyo (JP)

(72) Inventors: Rathna Kedilaya Herga, Redondo Beach, CA (US); Kevin R. Lu, Atlanta, GA (US); James A. Loftus, Jr., Alpharetta, GA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/173,514

(22) Filed: Feb. 11, 2021

(65) Prior Publication Data

US 2021/0250737 A1  Aug. 12, 2021

Related U.S. Application Data

(60) Provisional application No. 62/975,465, filed on Feb. 12, 2020.

(51) Int. Cl.
*H04W 4/38* (2018.01)
*G06F 3/0482* (2013.01)
*G06F 3/04847* (2022.01)

(52) U.S. Cl.
CPC ............ *H04W 4/38* (2018.02); *G06F 3/0482* (2013.01); *G06F 3/04847* (2013.01)

(58) Field of Classification Search
CPC ..... G06F 3/0482; G06F 3/04847; H04W 4/38
See application file for complete search history.

(56) References Cited

U.S. PATENT DOCUMENTS

| | | | |
|---|---|---|---|
| 6,091,340 A | * | 7/2000 | Lee .................. B60R 25/04 340/5.6 |
| 6,469,641 B1 | | 10/2002 | Lash et al. |
| 6,473,004 B1 | | 10/2002 | Smull |
| 6,542,077 B2 | | 4/2003 | Joao |
| 6,553,336 B1 | | 4/2003 | Johnson et al. |
| 6,687,583 B1 | | 2/2004 | Knoska et al. |
| 7,164,986 B2 | | 1/2007 | Humphries et al. |
| 7,277,010 B2 | | 10/2007 | Joao |
| 7,327,286 B2 | | 2/2008 | Knoska et al. |
| 7,397,363 B2 | | 7/2008 | Joao |
| 7,535,346 B2 | | 5/2009 | Kalous |
| 7,707,054 B2 | | 4/2010 | Ehrman et al. |

(Continued)

FOREIGN PATENT DOCUMENTS

| CN | 201188669 | 1/2009 |
|---|---|---|
| CN | 201700275 | 1/2011 |

(Continued)

OTHER PUBLICATIONS

Simrad BoatConnect, 2021, Retrieved from URL https://www.simrad-yachting.com/boatconnect/.

*Primary Examiner* — Eric J. Bycer
(74) *Attorney, Agent, or Firm* — Rankin, Hill & Clark LLP

(57) ABSTRACT

A system and method for providing marine connectivity that include receiving sensor data from a plurality of sensors of a watercraft. The system and method also include determining watercraft operational data associated with an operation of the watercraft. The system and method further include communicating the watercraft operational data to at least one external computing infrastructure associated with a user.

20 Claims, 11 Drawing Sheets

(56) References Cited

U.S. PATENT DOCUMENTS

| | | |
|---|---|---|
| 8,014,789 B2 | 9/2011 | Breed |
| 8,059,010 B2 | 11/2011 | Guazzelli |
| 8,164,306 B2 | 4/2012 | Mizushima et al. |
| 8,441,956 B2 | 5/2013 | Misumi et al. |
| 8,517,782 B2 | 8/2013 | Ota |
| 8,527,013 B2 | 9/2013 | Guba et al. |
| 8,531,316 B2 | 9/2013 | Velado et al. |
| 8,604,925 B2 | 12/2013 | Monte et al. |
| 8,676,402 B1 | 3/2014 | Foster |
| 8,959,036 B2 | 2/2015 | Huat |
| 8,983,713 B2 | 3/2015 | Shinohara et al. |
| 9,601,005 B2 | 3/2017 | Kusuno et al. |
| 9,630,496 B2 | 4/2017 | Cuddihy et al. |
| 9,630,590 B2 | 4/2017 | Doherty et al. |
| 9,878,769 B2 | 1/2018 | Kinoshita et al. |
| 9,986,197 B2 | 5/2018 | Gaynor |
| 10,015,637 B2 | 7/2018 | Shulman |
| 10,048,836 B2 | 8/2018 | Jones-McFadden et al. |
| 10,089,883 B2 | 10/2018 | Dorsch et al. |
| 10,152,876 B2 | 12/2018 | Joao |
| 10,650,621 B1* | 5/2020 | King .................. H04L 67/10 |
| 2002/0118102 A1 | 8/2002 | Fundak et al. |
| 2003/0206102 A1 | 11/2003 | Joao |
| 2004/0111195 A1 | 6/2004 | Vries et al. |
| 2006/0176193 A1 | 8/2006 | Wraight |
| 2008/0007431 A1 | 1/2008 | Jacques |
| 2008/0234878 A1 | 9/2008 | Joao |
| 2008/0299961 A1 | 12/2008 | Muller et al. |
| 2008/0319666 A1 | 12/2008 | Petrov et al. |
| 2010/0215511 A1 | 8/2010 | Eller et al. |
| 2013/0213344 A1* | 8/2013 | Stender .................. F02D 45/00 123/198 D |
| 2013/0238366 A1* | 9/2013 | Morgan ................ B60R 25/102 705/4 |
| 2014/0266793 A1 | 9/2014 | Velado et al. |
| 2014/0330453 A1* | 11/2014 | Nakagawa ............ B60L 53/305 701/2 |
| 2015/0210287 A1* | 7/2015 | Penilla ................ G06F 3/04842 701/49 |
| 2015/0258961 A1* | 9/2015 | Doherty .................. B60R 25/33 701/2 |
| 2015/0298654 A1 | 10/2015 | Joao et al. |
| 2016/0094699 A1* | 3/2016 | Shaout .............. H04M 1/72412 455/420 |
| 2016/0260058 A1 | 9/2016 | Benjamin et al. |
| 2017/0039668 A1* | 2/2017 | Luke .................... G07C 5/0808 |
| 2018/0072384 A1 | 3/2018 | Von Mueller |
| 2018/0139573 A1* | 5/2018 | Anderson ............. H04W 4/021 |
| 2018/0197349 A1* | 7/2018 | Oesterling ............. G07C 5/008 |
| 2018/0293806 A1 | 10/2018 | Zhang et al. |
| 2019/0019352 A1 | 1/2019 | Harper |
| 2019/0095607 A1 | 3/2019 | Howard |
| 2019/0103744 A1 | 4/2019 | Gaeto |
| 2019/0114846 A1 | 4/2019 | Whitmyer, Jr. |
| 2019/0143936 A1* | 5/2019 | Abel Rayan ............ B60R 25/10 701/2 |
| 2019/0281408 A1* | 9/2019 | Zhao ..................... H04W 4/021 |
| 2020/0180744 A1* | 6/2020 | Gonring ................ G08C 17/02 |

FOREIGN PATENT DOCUMENTS

| | | |
|---|---|---|
| CN | 102083169 | 6/2011 |
| CN | 103336246 | 10/2013 |
| CN | 105974870 | 9/2016 |
| CN | 206609545 | 11/2017 |
| CN | 107515277 | 12/2017 |
| CN | 107688318 | 2/2018 |
| CN | 107826533 | 3/2018 |
| CN | 108199478 | 6/2018 |
| CN | 108241326 | 7/2018 |
| CN | 207704253 | 8/2018 |
| CN | 207956019 | 10/2018 |
| CN | 207993077 | 10/2018 |
| CN | 110307873 | 10/2019 |
| CN | 110654265 | 1/2020 |
| CN | 209991280 | 1/2020 |
| DE | 202018104741 | 11/2019 |
| FR | 713811 | 11/1931 |
| GB | 200111894 | 5/2001 |
| GB | 2385239 | 8/2003 |
| GB | 201316357 | 9/2013 |
| GB | 2572941 | 10/2019 |
| JP | 2004317355 | 11/2004 |
| JP | 2006199097 | 8/2006 |
| KR | 101238711 | 3/2013 |
| KR | 20150093871 | 8/2015 |
| KR | 20180070027 | 6/2018 |
| KR | 102044868 | 11/2019 |
| RU | 193867 | 11/2019 |
| WO | WO200671123 | 7/2006 |
| WO | WO2008029221 | 3/2008 |
| WO | WO201201630 | 1/2012 |
| WO | WO2012140591 | 10/2012 |
| WO | WO2016191841 | 8/2016 |
| WO | WO2019043446 | 3/2019 |

* cited by examiner

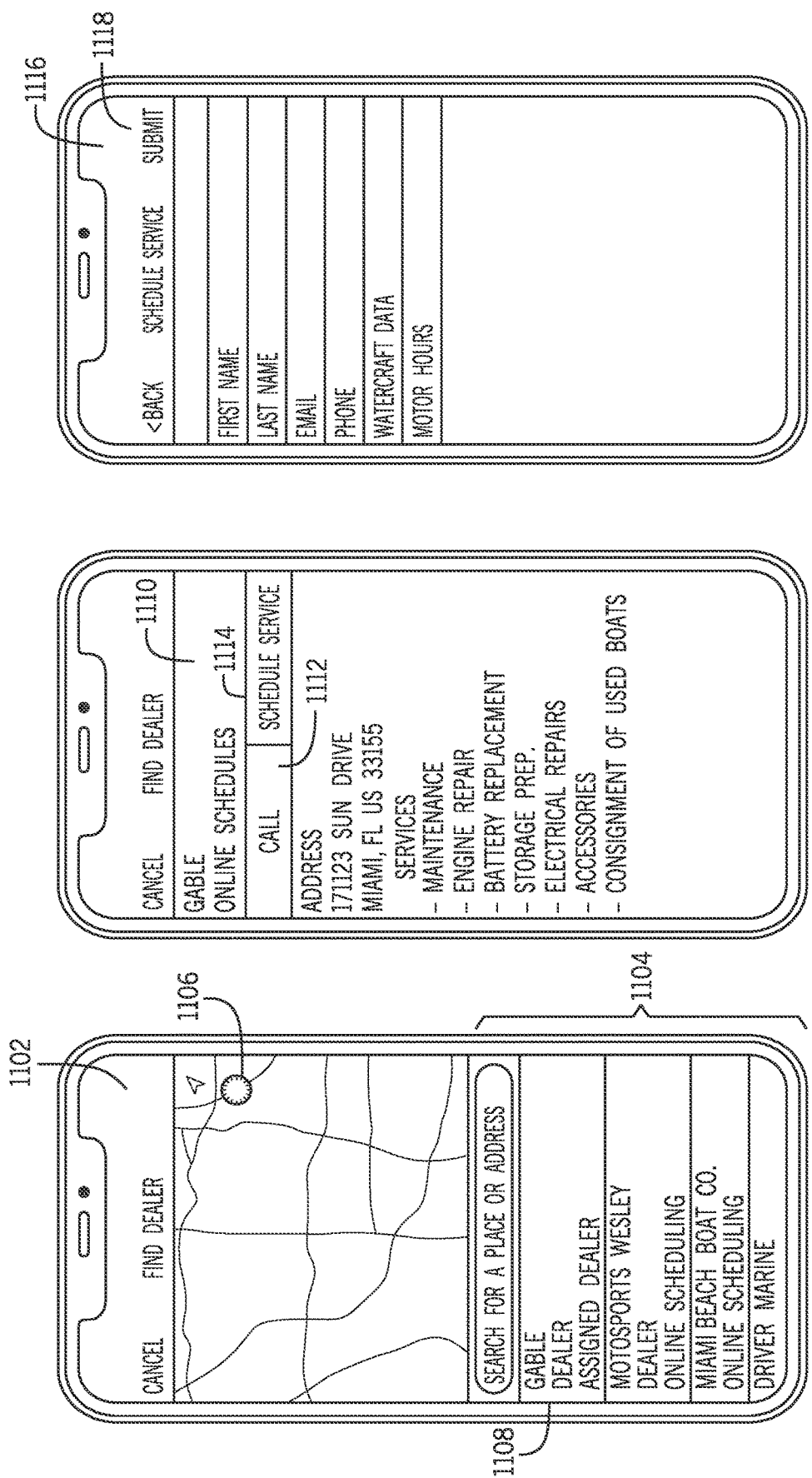

SYSTEM AND METHOD FOR PROVIDING MARINE CONNECTIVITY

CROSS-REFERENCE TO RELATED APPLICATION

This application claims priority to U.S. Provisional Application Ser. No. 62/975,465 filed on Feb. 12, 2020, which is expressly incorporated herein by reference.

BACKGROUND

Generally, owning and/or operating a watercraft may require an owner/operator of the watercraft to be reactive with respect to operational issues, mechanical issues, electronic issues, and/or other types of emergent and non-emergent issues. In some cases, when the watercraft is in operation, apart from voice based communications, there is little to no connection to one or more outside sources that may be provided with respect to such issues. Additionally, to determine symptoms that may cause such issues in many cases a service dealer may need to physically inspect the watercraft. For example, with respect to completing a diagnostic check of an engine of the watercraft, the watercraft may have to be hauled to the service dealer's location to be physically connected to the service dealer's computer to diagnose the issue.

BRIEF DESCRIPTION

According to one aspect, a computer-implemented method for providing marine connectivity that includes receiving sensor data from a plurality of sensors of a watercraft. The computer-implemented method also includes determining watercraft operational data associated with an operation of the watercraft. The operation of the watercraft includes at least one of: an operation of mechanical components of the watercraft, an operation of electrical components of the watercraft, and a dynamic operation of the watercraft. The computer-implemented method further includes communicating the watercraft operational data to at least one external computing infrastructure associated with a user. The watercraft operational data is communicated through various types of graphical user interfaces.

According to another aspect, a system for providing marine connectivity that includes a memory storing instructions when executed by a processor cause the processor to receive sensor data from a plurality of sensors of a watercraft. The instructions also cause the processor to determine watercraft operational data associated with an operation of the watercraft. The operation of the watercraft includes at least one of: an operation of mechanical components of the watercraft, an operation of electrical components of the watercraft, and a dynamic operation of the watercraft. The instructions further cause the processor to communicate the watercraft operational data to at least one external computing infrastructure associated with a user. The watercraft operational data is communicated through various types of graphical user interfaces.

According to yet another aspect, a non-transitory computer readable storage medium storing instructions that when executed by a computer, which includes a processor perform a method that includes receiving sensor data from a plurality of sensors of a watercraft. The method also includes determining watercraft operational data associated with an operation of the watercraft. The operation of the watercraft includes at least one of: an operation of mechanical components of the watercraft, an operation of electrical components of the watercraft, and a dynamic operation of the watercraft. The method further includes communicating the watercraft operational data to at least one external computing infrastructure associated with a user. The watercraft operational data is communicated through various types of graphical user interfaces.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

FIG. 11A is an illustrative example of a service request user interface of the marine connection application according to an exemplary embodiment of the present disclosure;

FIG. 11B is an illustrative example of a service dealer information interface of the marine connection application according to an exemplary embodiment of the present disclosure;

FIG. 11C is an illustrative example of a schedule service user interface of the marine connection application according to an exemplary embodiment of the present disclosure;

DETAILED DESCRIPTION

Figure 1:
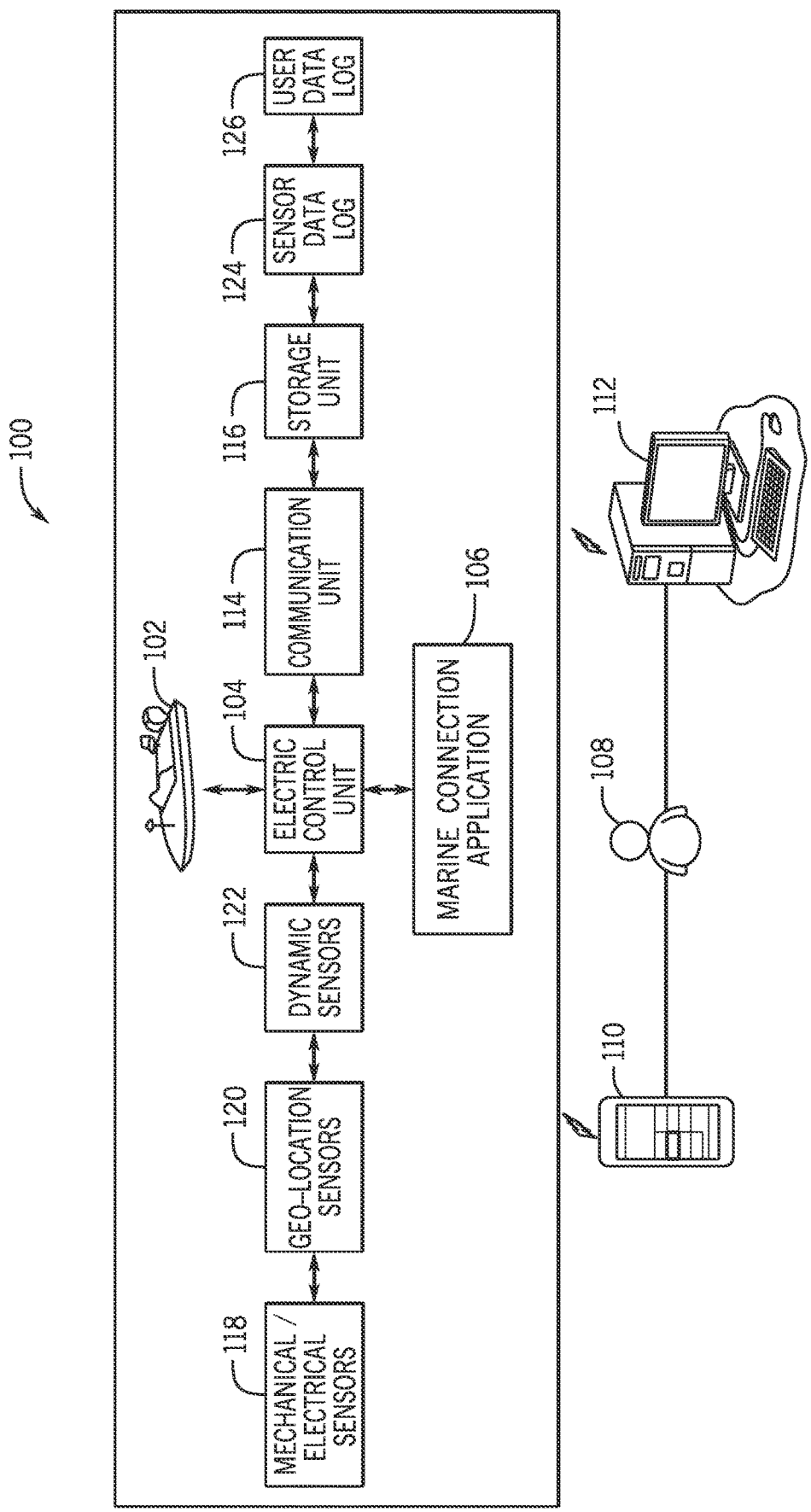
FIG. 1 is a schematic view of an operating environment for implementing systems and methods for providing marine connectivity according to an exemplary embodiment of the present disclosure.

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into organized into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Processor Area network (CAN), Local Interconnect network (LIN), among others.

"Component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk and/or a memory.

"Disk," as used herein can be, for example, a magnetic disk drive, a solid-state disk drive, a floppy disk drive, a tape drive, a Zip™ drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Input/output device" (I/O device) as used herein can include devices for receiving input and/or devices for outputting data. The input and/or output can be for controlling different vehicle features which include various vehicle components, systems, and subsystems. Specifically, the term "input device" includes, but it not limited to: keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware based controls, interfaces, touch screens, touch pads or plug and play devices. An "output device" includes, but is not limited to: display devices, and other devices for outputting information and functions.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Portable device", as used herein, is a computing device typically having a display screen with user input (e.g., touch, keyboard) and a processor for computing. Portable devices include, but are not limited to, handheld devices, mobile devices, smart phones, laptops, tablets and e-readers. The portable device may additionally include a wearable computing device that includes, but is not limited to, a computing device component (e.g., a processor) with circuitry that can be worn by and/or in possession of a user. Exemplary wearable computing devices can include, but are not limited to, watches, glasses, clothing, gloves, hats, shirts, jewelry, rings, earrings necklaces, armbands, shoes, earbuds, headphones and personal wellness devices.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Display unit", as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be located in various locations of a watercraft, for example, on a dashboard or center console. In some embodiments, the display is part of a portable device (e.g., in possession or associated with a user), a navigation system, an infotainment system, among others.

I. System Overview

Referring now to the drawings, wherein the showings are for purposes of illustrating one or more exemplary embodiments and not for purposes of limiting same, FIG. 1 is a schematic view of an operating environment 100 for implementing systems and methods for providing marine connectivity according to an exemplary embodiment of the present disclosure. The components of the environment 100, as well as the components of other systems, hardware architectures, and software architectures discussed herein, may be combined, omitted, or organized into different architectures for various embodiments.

In an exemplary embodiment, the environment 100 may include a marine watercraft (watercraft) 102 that may be configured to communicate watercraft operational data. The watercraft operational data is associated with the one or more types of remote monitoring categories that are associated with the operation of the watercraft 102 through one or more graphical user interfaces (user interfaces). In one or more embodiments, the watercraft 102 may be a vessel/ vehicle that may operate in water (e.g., salt water, freshwater) and may include, but may not be limited to a boat (e.g., boat with engine, sail boat, etc.), a ship (e.g., passenger ship, cargo ship), a hovercraft, a jet ski, a submarine, and the like. As discussed below, the watercraft 102 may be configured to wirelessly communicate operational data to one or more parties (e.g., owners, operators, OEM, dealers, repair shops, etc.) through one or more computing systems and/or to one or more additional watercraft (e.g., through direct vehicle to vehicle communications) through one or more communication mediums.

In one or more embodiments, the watercraft 102 may include an electronic control unit (ECU 104) that may be configured to operably control the components of the watercraft 102. As discussed in more detail below, the ECU 104 may be configured to execute a marine connection application 106. The marine connection application 106 may be configured to utilize one or more components of the watercraft 102 to provide remote monitoring of the watercraft 102. Such remote monitoring may be based on a reception of sensor data from one or more sensors of the watercraft 102 (discussed below) that may be utilized to determine watercraft operational data associated with one or more of the remote monitoring categories. The one or more of the remote monitoring categories may include, but may not be limited to, daily operation of the watercraft 102, geolocations of the watercraft 102, electronic/mechanical data associated with the watercraft 102 (e.g., one or more electronic and/or mechanical components of the watercraft 102), financial data associated with the watercraft 102, safety related data associated with the operation of the watercraft 102, and the like.

In an exemplary embodiment, the marine connection application 106 may be configured to communicate watercraft operational data for one or more of the remote monitoring categories to one or more users 108. The user(s) 108 may include, but may not be limited to, an owner(s) of the watercraft 102, one or more parties who leases/rents the watercraft 102 (e.g., party who leases/rents the watercraft 102 or party who leases/rents out the watercraft 102), one or more operators of the watercraft 102, one or more parties who maintain the watercraft 102 (e.g., service dealers), a one or more parties who stores/docks the watercraft 102, a manufacturer (OEM) of the watercraft 102, one or more manufacturers of one or more components of the watercraft 102, one or more third-party agencies (e.g., regulatory agencies, safety agencies, coast guard), and the like.

As discussed in more detail below, the marine connection application 106 may be configured to communicate the watercraft operational data through one or more respective portable devices 110 and/or one or more external computing platforms 112 (e.g., externally hosted server infrastructure) used by the user(s) 108. For example, the marine connection application 106 may be configured to automatically communicate push-notifications and/or data points based on user input requests that include the watercraft operational data. In one or more embodiments, the one or more external computing platforms 112 may also include electronic control unit(s) (not shown) of an additional watercraft(s) that may be configured to communicate with the watercraft 102, vehicle computing device(s) (not shown) of additional vehicle(s) (e.g., cars, trucks, etc.) that may be configured to communicate with the watercraft 102, and/or an externally hosted server infrastructure that may be hosted/owned/operated by one or more third-parties that may be granted access privileges to remotely monitor the watercraft 102.

In one embodiment, one or more remote monitoring categories pertaining to the daily operation of the watercraft 102 may include, but may not be limited to, weather conditions at a surrounding location of the watercraft 102, water depth at the surrounding location of the watercraft 102, temperature conditions associated with one or more interior cabins of the watercraft 102, conditions associated with a baitwell of the watercraft 102, temperature conditions associated with a baitwell of the watercraft 102, temperature conditions associated with one or more refrigeration units of the watercraft 102, temperature conditions associated with one or more HVAC units of the watercraft 102, fuel level of the watercraft 102, etc.

The one or more remote monitoring categories pertaining to the geo-locations of the watercraft 102 may include, but may not be limited to, one or more GPS/DGPS locations of the watercraft 102, the presence of the watercraft 102 within one or more geo-fence parameters, the presence of the watercraft 102 at/near one or more GPS waypoints, logged data associated with geo-location tracking (e.g., breadcrumb tracking) of the watercraft 102 during one or more particular timeframes, trip log data associated with one or more trips of the watercraft 102, one or more GPS/DGPS locations of fueling stations, one or more GPS/DGPS locations of service dealers, geo-location pin-drop locational data, geo-fence parameter locational data, geo-location configuration information, and the like.

The one or more remote monitoring categories pertaining to the electronic/mechanical data associated with the watercraft 102 may include, but may not be limited to, engine metrics (e.g., engine temperature, engine oil health, engine coolant health, etc.), engine diagnostics, engine trouble codes (e.g., overheating code), health of mechanical components of one or more engines of the watercraft 102 and/or additional mechanical components (e.g., propellers) of the watercraft 102, health of electronic components (e.g., computing systems) of the watercraft 102, service record data associated with servicing of one or more electrical/mechanical components of the watercraft 102, service scheduling data associated with scheduling services of one or more electrical/mechanical components of the watercraft 102, battery metrics, trouble codes, battery charge data, and/or battery health data of one or more batteries of the watercraft 102, shore-power plug-in status of a power control unit (not shown) of the watercraft 102, service log data, service scheduling data, preferred service dealer data, fleet management data, and the like.

In one or more embodiments, the one or more remote monitoring categories pertaining to the safety related data associated with the watercraft 102 may include, but may not be limited to, binge pump run time alerts, severe weather alerts, high wave alerts, high water alerts, severe wind alerts, unsafe operation alerts, sonar alerts, fire alerts, smoke detection alerts, SOS alerts, depth alerts, speed alerts, motion sensor alerts, security system alerts, fuel level alerts, battery charge level alerts, wireless communication issue alerts, weight alerts, weight distribution alerts, door ajar alerts, lock/unlock alerts, seatbelt alerts, unsafe maneuver alerts, anchor related alerts, sail related alerts, tow related alerts, and the like.

The marine connection application 106 may also be configured to utilize one or more components of the watercraft 102 to provide remote actuation of one or more components of the watercraft 102 by one or more of the users 108 that are authorized to do so (e.g., authorized by the owner of the watercraft 102). In particular, the marine connection application 106 may be configured to communicate with the ECU 104 to enable a remote enablement, remote disablement, or remote adjustment of settings of one or more components of the watercraft 102, including, but not limited to a remote enablement, disablement, and/or adjustment of an engine/engine settings of the watercraft 102, watercraft systems and sub-systems (not shown) including but not limited to lighting systems, security systems, HVAC systems, audio systems, power control systems, battery charging systems, and the like.

Further, the marine connection application 106 may be configured to communicate with the ECU 104 to restrict operation of the watercraft 102 in one or more circumstances that may be inputted by one or more authorized users through user interfaces of the application 106. Such circumstances may include, but may not be limited to, if the watercraft 102 is operating in one or more restricted areas that may be associated with one or more geo-fence locations, if the watercraft 102 is operating under unsafe conditions (e.g., operation during bad weather), if the engine(s) of the watercraft 102 are outputting one or more high level error codes, if the watercraft is operating outside of pre-set controls (e.g., speed controls), if the watercraft is determined to be lost/stolen, and the like.

In one or more embodiments, the marine connection application 106 may be configured to communicate with one or more external computing systems, through one or more communication mediums, to communicate data for one or more of the remote monitoring categories and/or to receive remote commands (e.g., for enablement, disablement, adjustment of settings) with respect to one or more components of the watercraft 102. As discussed below, the marine connection application 106 may be configured to provide a human machine interface (HMI) in the form of one or more marine connection user interfaces.

The one or more marine connection user interfaces may be provided to the user(s) 108 through the portable device 110 and/or one or more external computing platforms 112 to allow the user(s) 108 to register the watercraft 102, register an owner of the watercraft 102, add additional sensors and/or components to be monitored by the application 106, (electronically) store documentation associated with the watercraft 102 and/or one or more components of the watercraft 102. The one or more marine connection user interfaces may also be provided to allow the user(s) 108 to set user customized alerts. Such user customized alerts may be customized to provide the user(s) 108 with one or more particular types of alerts a frequency of one or more particular types of alerts, and/or a notification time period (e.g., timeframe) and an expiry time (e.g., particular date) that is associated with one or more types of alerts. Additionally, the user customized alerts may be customized to allow the user to set one or more pre-set controls that may affect operation of one or more components of the watercraft 102. Such pre-set controls may include, but may not be limited to, parental controls, operational controls, logistical controls, and the like.

The one or more marine connection user interfaces may also be provided to the user(s) 108 to allow the user(s) 108 to receive selected watercraft operational data for one or more of the monitoring categories associated with the watercraft 102. Additionally, the one or more marine connection user interfaces may allow the user(s) 108 to remotely enable, disable, and/or adjust one or more settings of one or more components of the watercraft 102. The one or more marine connection user interfaces may also allow the user(s) 108 to customize settings associated with the presentation (e.g., interface layout, notification type and/or frequency, types of watercraft operational data to be displayed, etc.), of the watercraft operational data for one or more of the monitoring categories associated with the watercraft 102.

In one or more embodiments, the marine connection application 106 may be configured to communicate watercraft operational data for one or more of the remote monitoring categories to one or more additional parties/entities that may remotely monitor the watercraft 102. The marine connection application 106 may enable one or more users 108 to assign access privileges to one or more additional parties/entities. Such parties/entities may include, but may not be limited to, dealers, persons who are servicing the watercraft 102, and/or temporarily operate the watercraft 102, etc.

In some configurations, the marine connection application 106 may also allow the one or more additional parties/entities (that may be provided access privileges by the one or more users 108) to remotely enable, disable, and/or adjust one or more settings of one or more components of the watercraft 102. In additional configurations, the marine connection application 106 may also enable the one or more additional parties/entities to be provided with notifications based on sensed data (e.g., sensor readings, errors) through one or more user interfaces (e.g., in the form of error codes, user interface notification alerts).

With continued reference to FIG. 1, the ECU 104 may include provisions for processing, communicating, and interacting with various components of the watercraft 102 and other components of the environment 100. Generally, the ECU 104 may include a respective processor (not shown), a respective memory (not shown), a respective disk (not shown), and a respective input/output (I/O) interface (not shown), which are each operably connected for computer communication via a respective bus (not shown). The I/O interfaces provide software and hardware to facilitate data input and output between the components of the ECU 104 and other components, networks, and data sources, of the environment 100.

In one embodiment, the ECU 104 may be operably connected to a communication unit 114 of the watercraft 102. The communication unit 114 may be configured as a telematics control unit (TCU) that may be utilized to send communication data packets of watercraft operational data associated with one or more remote monitoring categories to one or more portable device(s) 110 and/or one or more external computing platforms 112 through the marine connection application 106. For example, the communication unit 114 may be configured to communicate tracking information that may be used to track a current geo-location of the watercraft 102 to ensure that the watercraft 102 may be located (e.g., found at a particular geo-location).

The communication unit 114 may also be configured to receive data packets of one or more commands that may include commands to remotely enable one or more components of the watercraft 102, remotely disable one or more components of the watercraft 102, and/or remotely adjust settings of one or more components of the watercraft 102. Additionally, the communication unit 114 may be configured to receive data packets of one or more commands that may be executed to retrieve select sensor data that may be communicated in real-time from one or more sensors of the watercraft 102 and/or retrieved from a storage unit 116 of the watercraft 102, as discussed below.

In an exemplary embodiment, the communication unit 114 may include one or more wireless transceivers that may be located at one or more areas of the watercraft 102, as part of one or more electrical components of the watercraft 102 (e.g., battery), as part of one or more mechanical components of the watercraft 102 (e.g., engine). The one or more wireless transceivers of the communication unit 114 may be capable of providing computer communications utilizing various wireless communication protocols to be utilized to send/receive electronic signals internally to components of the watercraft 102 and/or one or more data packets to/from one or more portable devices 110 and/or one or more external computing platforms 112.

In one or more embodiments, the communication unit 114 may be configured to provide one or more types of wireless based communications, including, but not limited to IEEE 802.11 (Wi-Fi), IEEE 802.15.1 (Bluetooth®), near field communication system (NFC) (e.g., ISO 13157), via the wireless communications network/infrastructure. In particular, the communication unit 114 may be configured to provide such communications utilizing various protocols to send/receive non-transitory signals internally to the plurality of components of the watercraft 102 and/or externally to the portable device(s) 110 and/or the external computing platform(s) 112 through an internet cloud (not shown).

In one embodiment, the communication unit 114 may be configured to communicate via a National Marine Electronics Association communication protocol (NMEA). For example, the NMEA protocol may be used to send communication data packets of watercraft operational data associated with one or more remote monitoring categories to one or more users 108 that may include the OEM and/or one or more dealers/service entities.

The communication unit 114 may also be configured to communicate via a dedicated short range communication protocol (DSRC network) that may be used to provide data transfer to send/receive electronic signals directly between the communication unit 114 of the watercraft 102 and one or more communication units (not shown) of one or more respective additional watercrafts and/or vehicles. For example, the communication unit 114 may be configured to utilize the DSRC network to send/receive electronic signals that may include data packets of watercraft operational data associated with one or more remote monitoring categories to the external computing platforms 112 of an additional watercraft through a vehicle to vehicle (V2V) network.

The marine connection application 106 may utilize the communication unit 114 to send and/or receive data to the portable device(s) 110 to be presented and/or received through one or more user interfaces of the marine connection application 106. For example, the marine connection application 106 may utilize the communication unit 114 to send watercraft operational data that pertains to the daily operation of the watercraft 102 and geo-locations associated with the watercraft 102 to be presented to one or more users 108 that may include an owner(s) of the watercraft 102 through user interfaces of the application 106.

The marine connection application 106 may also utilize the communication unit 114 to send and/or receive data to one or more external computing platforms 112 directly to be presented through user interfaces of the application 106 or through third-party application interfaces (not shown). For example, the marine connection application 106 may utilize the communication unit 114 to send watercraft operational data that pertains to electronic/mechanical data associated with the watercraft 102 to one or more dealers/service entities through third-party dealer application interfaces.

In some embodiments, the communication unit 114 may be configured to include a satellite transceiver (e.g., satellite radio transceiver) that may be configured to communicate with one or more satellites. The satellite transceiver and/or the one or more wireless transmitters of the watercraft 102 may be configured to receive data packets that include one or more types of information that may be presented on one or more user interfaces through one or more display units (not shown) of the watercraft 102. Such information may include, but may not be limited to, mapping content, news content, weather content, sports content, entertainment content, audio content, point of interest content, pricing content, and the like. For example, the satellite transceiver and/or the one or more wireless transmitters of the watercraft 102 may be configured to receive data packets that include data associated with fuel prices, movie listings, sports scores, sports highlights, news headlines, news clips, and weather forecasts that may be presented through one or more user interfaces through a display unit of the watercraft 102.

The application 106 may be configured to provide the one or more user interfaces that present such content in an easy to use intuitive fashion to enable the user(s) 108 to easily navigate through the content while on-board the watercraft 102. In some embodiments, the one or more user interfaces may also be configured to present one or more third-party applications that may be utilized by the user(s) 108 while on-board the watercraft 102. Such third-party applications may include, but may not be limited to, video streaming applications, live television applications, music streaming applications, social media applications, power monitoring applications, security system applications, navigational applications, and the like.

In one embodiment, the storage unit 116 of the watercraft 102 may be configured to store one or more operating systems, applications, associated operating system data, application data, watercraft system and subsystem user interface data, and the like that are executed by the ECU 104. For example, the storage unit 116 may be configured to store one or more data files (e.g., executable data files) of the marine connection application 106. In one embodiment, the storage unit 116 may store a sensor data log 124. As discussed in more detail below, the sensor data log 124 may be utilized by the application 106 to log sensor data points provided by one or more sensors of the watercraft 102. The storage unit 116 may also store a user data log 126 that may be utilized by the application 106 to store one or more user records respectively associated with one or more users 108 of the application 106.

In one or more embodiments, the watercraft operational data may be derived from sensor data that may be provided by mechanical/electrical sensors 118, geo-location sensors 120, and/or dynamic sensors 122. In an exemplary embodiment, the mechanical/electrical sensors 118 may include sensors that may be operably and/or physically connected to one or more mechanical components of the watercraft 102 (e.g., engine components). The mechanical/electrical sensors 118 may be configured to sense changes in mechanical properties of the one or more mechanical components of the watercraft 102.

The mechanical/electrical sensors 118 may also include sensors that may be operably and/or physically connected to one or more electrical components of the watercraft (e.g., head unit components). The mechanical/electrical sensors 118 may be configured to sense changes in electrical properties/current of one or more electrical components (e.g., battery components) of the watercraft 102. In some configurations, the mechanical/electrical sensors 118 may include, but may not be limited to, temperature sensors, pressure sensors, light sensors, ultrasonic sensors, smoke sensors, gas sensors, liquid level sensors, filter sensors, cantilever sensors, acoustic sensors, optical sensors, voltage sensors, knock sensors, airflow sensors, torque sensors, transducer sensors, current sensors, fire sensors, water in-take sensors, instrument sensors, security sensors, door sensors, window sensors, weight sensors, motion sensors, capacitance sensors, and the like.

In one or more embodiments, the geo-location sensors 120 may be configured as GPS/DGPS/GNSS sensors. The geo-location sensors 120 may be configured to determine a real-time current geo-location of the watercraft 102 based on GPS/DGPS/GNSS locational coordinates of the watercraft 102 at a particular point in time. The geo-location sensors 120 may include one or more integrated satellite navigation antennas that may be configured to communicate with one or more satellites to determine position, velocity, and timing information associated with the watercraft 102. In some embodiments, the geo-location sensors 120 may also be operably connected to sonar sensors, radar sensors, LiDAR sensors, image sensors, and the like that may provide auxiliary information (e.g., water depth, objects located within the surrounding environment of the watercraft 102) associated with the geo-location(s) of the watercraft 102. In some embodiments, the marine connection application 106 may provide functionality associated with finding the watercraft 102, locating the watercraft 102 that may be lost/stolen, tracking one or more trips of the watercraft 102, and/or suggesting one or more trips that may be taken by the watercraft 102 based on data that is provided by the geo-location sensors 120.

In an exemplary embodiment, the dynamic sensors 122 may be configured to provide dynamic parameters associated with the dynamic performance of the watercraft 102 (e.g., dynamic performance of the engine, the electrical components, and/or the mechanical components) during operation of watercraft 102. The dynamic sensors 122 may include, but may not be limited to, water speed sensors, acceleration sensors, brake sensors, heading sensors, temperature sensors, and the like. As discussed below, the marine connection application 106 may be configured to communicate one or more notifications based on sensed data (e.g., sensor readings, errors) provided by the mechanical/electrical sensors 118, the geo-location sensors 120, and/or the dynamic sensors 122 through one or more user interfaces (e.g., in the form of error codes, user interface notification alerts). Additionally, the application 106 may be configured to communicate watercraft operational data based on sensed data provided by the mechanical/electrical sensors 118, the geo-location sensors 120, and/or the dynamic sensors 122 through one or more user interfaces (e.g., based on user input) that may be provided to the user(s) 108 through the portable device 110 and/or one or more external computing platforms 112.

In one or more embodiments, the mechanical/electrical sensors 118 may be configured to determine one or more emergency scenarios that may require an immediate SOS code signal to be transmitted by the communication unit 114. For instance, if the mechanical/electrical sensors 118 sense a fire on-board which may compromise the safety of the watercraft 102, the mechanical/electrical sensors 118 may communicate respective data to the marine connection application 106. The marine connection application 106 may responsively communicate with the geo-location sensors 120 to determine the current geo-location of the watercraft 102. The marine connection application 106 may further communicate with the dynamic sensors 122 to determine relevant dynamic parameters associated with the dynamic performance of the watercraft 102.

The marine connection application 106 may utilize the communication unit 114 to communicate an SOS signal(s) associated with details emergency scenario(s), the current geo-location (e.g., locational coordinates) of the watercraft 102, and/or relevant dynamic parameters to one or more additional watercraft that may be located within the surrounding environment of the watercraft 102 through the DSRC network. The marine connection application 106 may also communicate the SOS signal(s) associated with details of the emergency scenario(s), the current geo-location of the watercraft 102, and/or relevant dynamic parameters to one or more user(s) 108 through one or more additional wireless protocols (e.g., wireless communication from the communication unit 114 to an external computing platform(s) 112 operated by the coast guard). In some embodiments, the marine connection application 106 may also communicate the SOS signal(s) associated with details of the emergency scenario(s), the current geo-location of the watercraft 102, and/or relevant dynamic parameters to one or more user(s) 108 through a satellite signal. This functionality may enable one or more land based external computing platform(s) 112 and/or aircraft based external computing platform(s) 112 to receive the SOS signal(s) associated with the details of the emergency scenario(s).

In one or more embodiments, the marine connection application 106 may also be configured to store the sensor data that may be provided by the mechanical/electric sensors 118, the geo-location sensors 120, and/or the dynamic sensors 122 upon the sensor data log 124. The sensor data log 124 may be utilized by the application 106 to log sensor data points provided by the mechanical/electrical sensors 118, geo-location sensors 120, and/or the dynamic sensors 122 of the watercraft 102. As discussed below, the sensor data points that may be logged within the sensor data log 124 may be retrieved by the application 106 to present one or more user interfaces that may provide tracked data that may be tracked for one or more periods of time.

The one or more user interfaces may provide tracked data that may include, but not limited to, maintenance records, trip logs, sensor error code records, service records, mechanical component health records, electrical component health records, and the like. As discussed below, the one or more user interfaces may be presented in one or more graphical formats to provide tracked data in various manners. For example, the one or more user interfaces may be presented as a user interface list (e.g., trip log list of past trips, favorite trips (as designated by the user(s) 108), as a summary report (e.g., health report), a user interface map (e.g., map of travel routes, map of locations of service dealers, map of locations of fueling stations), a dashboard (e.g., overview of one or more types of watercraft operational data), an interface with one or more graphs, an interface with raw sensor data, etc.

In some embodiments, the one or more user interfaces may also be utilized to present one or more reminders to the user(s) 108. Such reminders may include, but may not be limited to, maintenance reminders, operational reminders, safety reminders, and the like that may be provided based on sensor data that has been previously provided by the mechanical/electric sensors 118, the geo-location sensors 120, and/or the dynamic sensors 122 and stored upon the sensor data log 124. For example, the one or more user interfaces may provide maintenance reminders, operational reminders, and/or safety reminders to owner(s) of the watercraft 102, one or more preferred service dealers selected by the owner(s) of the watercraft 102, one or more authorized users, and/or one or more additional parties/entities that have been authorized by the user(s) 108.

In one or more embodiments, the one or more user interfaces may also be utilized to present data that may be associated with a fleet of watercraft that may be owned, operated, maintained, monitored, and/or utilized by one or more users 108. Such data may include various types of watercraft operational data associated with each of the watercraft within the fleet. The user interface(s) may also present tracked data that may be associated with one or more watercraft of the fleet and may be presented in various forms of graphics and/or graphical interfaces. In some embodiments, the one or more user interfaces may also be utilized to present data that may be associated with a fleet may include fleet information. The fleet information may pertain to, but may not be limited to pertaining to ports of calls of each watercraft of the fleet, an estimated time of departure from a respective port of each watercraft of the fleet, an estimated time of arrival to a respective port of each watercraft of the fleet.

In some embodiments, the one or more user interfaces may also be utilized to present data that may be associated with a commercial fleet that may include one or more commercial watercraft (e.g., cargo ships). The one or more user interfaces that present data that may be associated with the commercial fleet may include port of call information, information pertaining to a specific cargo load that may be hauled by each respective water craft of the fleet, supply chain related data associated with the specific cargo load that may be hauled by each respective water craft of the fleet, port of call information including but not limited to, watercraft weight/size restriction data associated with each port, import/export/tariff related information associated with each port, fees associated with each port, and the like.

In some configurations, the one or more user interfaces that present data that may be associated with the commercial fleet may present a watercraft heat map.

The watercraft heat map may be presented as a geographic map that includes locations all of the watercraft of a particular fleet. In one embodiment, each of the watercraft presented upon the watercraft heat map may be selected by the user(s) 108 to present one or more particular user interfaces of the marine connection application 106 that provide information associated with the selected watercraft. In some embodiments, the heat map may be presented in various levels, scales, sizes, and may present various mapping data points (e.g., bodies of water, regions, ports, cities, states, local landmarks, points of interest, etc.) based on selection of the user(s) 108. For example, the heat map may allow the user(s) 108 to zoom-in or zoom-out using one or more types of inputs (e.g., keyboard inputs, pinching touch-gestures) to present the heat map in one or more levels, scales, and/or sizes.

With particular reference to the user data log 126, in one configuration, the user data log 126 may be managed by the marine connection application 106 to store user records that may be associated with each of the users 108 of the application 106. In one embodiment, during an initial usage of the marine connection application 106, the application 106 may be configured to present one or more setup user interfaces to the user(s) 108 of the application 106 to setup a user record associated with the respective user(s) 108. The user record may include a designation of the user(s) 108 as an owner(s) of the watercraft 102, one or more parties who leases/rents the watercraft 102, an operator(s) of the watercraft 102, one or more parties who maintain the watercraft 102, a one or more parties who stores/docks the watercraft 102, the OEM of the watercraft 102, one or more manufacturers of one or more components of the watercraft 102, one or more agencies, and the like. Additionally, the one or setup user interfaces may enable the user(s) 108 of the application 106 to setup one or more third-party records that may be associated with one or more third parties/entities who are selected by the user(s) 108 to maintain the watercraft 102 (e.g., service dealers), store/dock the watercraft 102, and the like (e.g., on a temporary basis).

In some embodiments, the application 106 may be configured to automatically add one or more user records that may be associated with users 108 and/or one or more third-party records that may be associated with one or more third parties/entities based on the determination that one or more users and/or third parties/entities are utilizing, handling, maintaining, storing, and/or docking the watercraft 102. Each of the user records and/or third party records stored within the user data log 126 may include, but may not be limited to, names, addresses, contact information, user credentials, watercraft registration information, watercraft documentation (e.g., insurance documents, operational licenses), financial account information (e.g., wiring instructions, routing instructions), component customization/addition information (e.g., addition of third-party systems, sensors, and/or components), user application account link information (e.g., linked social media account information, linked e-mail account information), data associated with favorite trips and/or favorite points of interest, data associated with preferred service dealers, data associated with one or more preferred service dealers, and the like. Additionally, each of the user records and/or third party records stored within the user data log 126 may include access privileges that may be assigned by the owner(s) of the watercraft 102. The access privileges may allow each of the one or more users 108 and/or third parties/entities to access and/or communicate watercraft operational data associated with one or more of the remote monitoring categories, remotely enable, disable, and/or adjust settings of one or more components of the watercraft 102, and/or utilize the watercraft 102 in one or more manners.

II. The Marine Connection Application and Exemplary Interfaces

The marine connection application 106 and its components will now be described in more detail according to an exemplary embodiment and with continued reference to FIG. 1. In one or more embodiments, the marine connection application 106 may be stored on the storage unit 116 of the watercraft 102 and may be executed by the ECU 104 of the watercraft 102. The marine connection application 106 may additionally be stored on a memory (not shown) of the portable device 110 and may be executed by a processor (not shown) of the portable device 110. Additionally or alternatively, the marine connection application 106 may be stored on a memory (not shown) of the external computing platform(s) 112 and may be executed by a processor(s) (not shown) of the external computing platform(s) 112.

Figure 2:
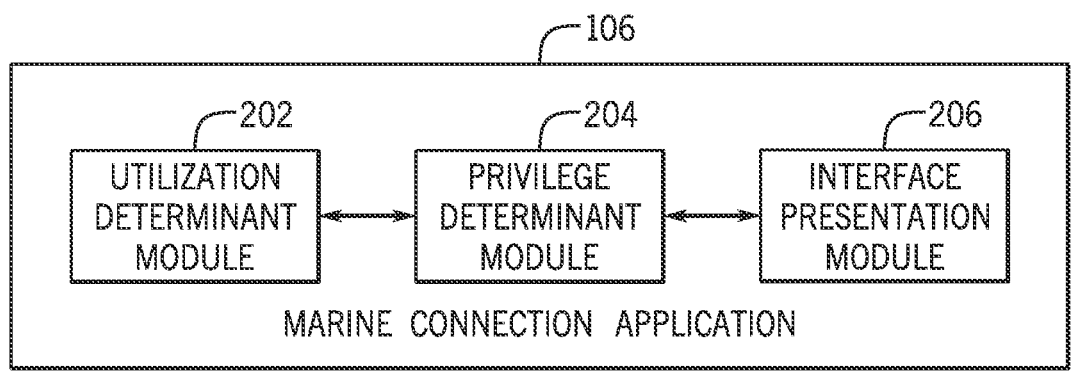
FIG. 2 is a schematic view of a marine connection application according to an exemplary embodiment of the present disclosure.

FIG. 2 is a schematic view of a plurality of modules 202-206 of the marine connection application 106 that may execute computer-implemented instructions for providing marine connectivity according to an exemplary embodiment of the present disclosure. In an exemplary embodiment, the plurality of modules 202-206 may include a utilization determinant module 202, a privilege determinant module 204, and an interface presentation module 206. It is appreciated that the marine connection application 106 may include one or more additional or alternative modules and/or sub-modules that are included in addition to or in lieu of the modules 202-206. A computer-implemented method that is executed by the modules 202-206 for providing marine connectivity will now be described in addition to exemplary user interfaces of the marine connection application 106.

Figure 3:
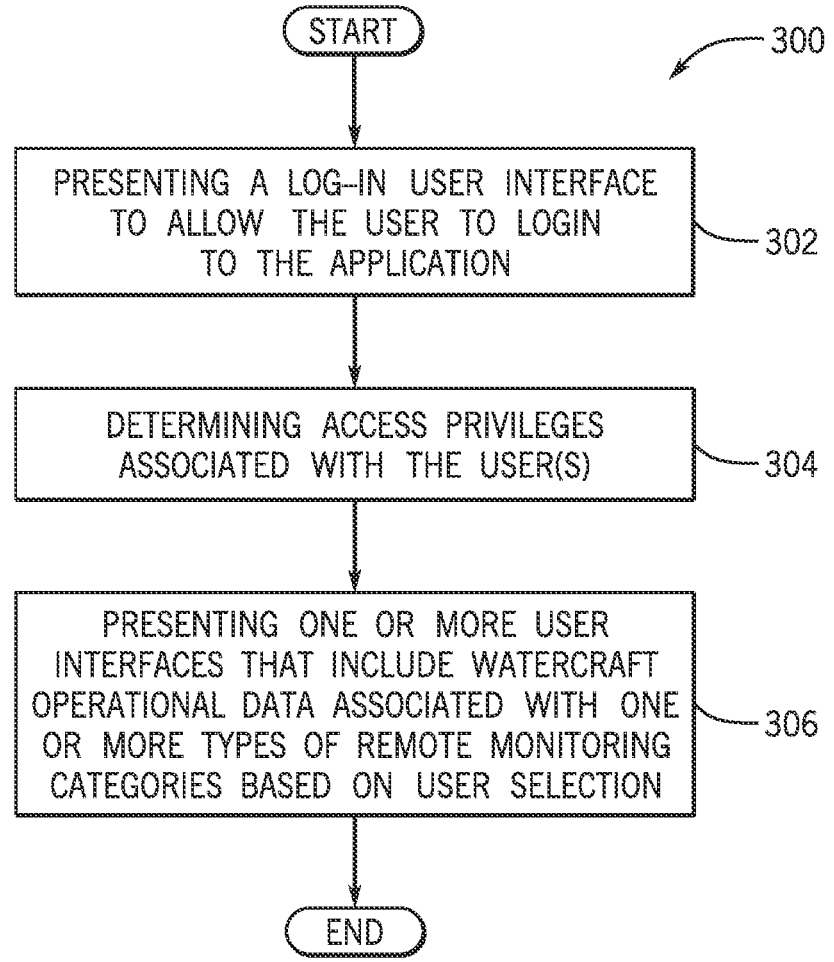
FIG. 3 is a process flow diagram of a method of presenting one or more user interfaces of the marine connection application according to an exemplary embodiment of the present disclosure.

In one embodiment, based on access privileges associated to the user(s) 108 as determined by the privilege determinant module 204 of the marine connection application 106, the user(s) 108 of the marine connection application 106 may utilize the portable device(s) 110 and/or the external computing platform(s) 112 to view one or more user interfaces of the marine connection application 106. FIG. 3 is a process flow diagram of a method 300 of presenting one or more user interfaces of the marine connection application 106 according to an exemplary embodiment of the present disclosure. Some illustrative examples will be discussed below and may be associated with illustrations that present user interfaces of the marine connection application 106 on the portable device(s) 110. However, it is to be appreciated that the user interfaces of the application 106 may be presented on one or more display units that may be connected to external computing platform(s) 112 and/or may be configured within the watercraft 102.

Figure 4:
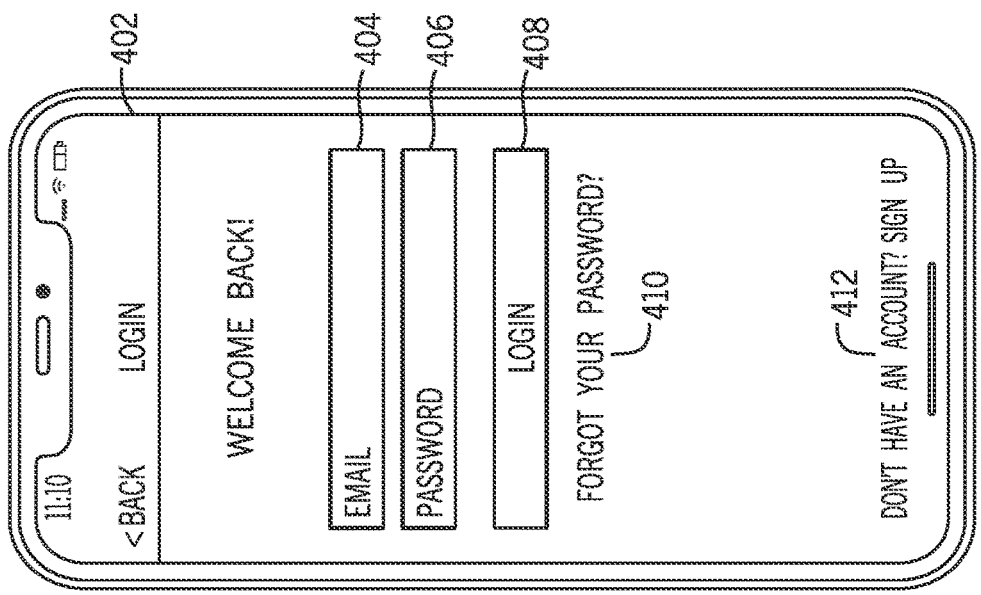
FIG. 4 is an illustrative example of a log-in user interface of the marine connection application according to an exemplary embodiment of the present disclosure.

FIG. 3 will be described with reference to the components of FIG. 1, though it is to be appreciated that the method of FIG. 3 may be used with other systems/components. The method 300 may begin at block 302, wherein the method 300 may include presenting a log-in user interface to allow the user to login to the application 106. With reference to FIG. 4, in an exemplary embodiment, upon enablement of the marine connection application 106 through the portable device(s) 110 and/or the external computing platform(s) 112, the utilization determinant module 202 of the marine connection application 106 may be configured to determine that one or more users 108 may be attempting to utilize the marine connection application 106 to retrieve watercraft operational data. Upon determining that one or more users 108 may be attempting to utilize the marine connection application 106, the utilization determinant module 202 may be configured to present a log-in user interface 402. The log-in user interface 402 may include user interface input textboxes 404, 406 that may allow the user(s) 108 to input respective user credentials that may be utilized to view one or more user interfaces of the marine connection application 106.

In one embodiment, the utilization determinant module 202 may present the log-in user interface 402 with a login user interface input icon 408 that may allow the user(s) 108 to complete the log-in process. Additionally, the log-in user interface 402 may include a forget password user interface input icon 410 that may allow the user(s) 108 to retrieve a forgotten password. The log-in user interface 402 may also include a sign up user interface input icon 412 that may enable the user(s) 108 who has not previously logged into the marine connection application 106 to sign up for an account to access the application 106 and setup a user record associated with the respective user(s) 108. In one embodiment, if the user(s) 108 who has not previously logged into the marine connection application 106 inputs the sign up user interface input icon 412 and provides user information to setup an account to access the application 106 and setup the user record, the utilization determinant module 202 may store the user record associated with the new user account upon the user data log 126.

In one embodiment, when the user(s) 108 has an active account to access and login to the marine connection application 106, upon the input of valid user credentials and the login user interface input icon 308, the utilization determinant module 202 may be configured to access and query the user data log 126 for matching user credentials to allow the user(s) 108 to log-in and utilize the application 106. It is appreciated that various additional types of user credentials may be used by the utilization determinant module 202 and stored within the user data log 126, including, but not limited to, face recognition, voice recognition, finger print recognition, pupil recognition, key card, QR code, and the like.

Referring again to the method 300 of FIG. 3, upon presenting the log-in user interface 402 (at block 302), the method 300 may proceed to block 304, wherein the method 300 may include determining access privileges associated with the user(s) 108. In an exemplary embodiment, upon the user(s) 108 logging into the marine connection application 106, the utilization determinant module 202 may be configured to communicate data associated with the login of the user(s) 108 to utilize the application 106 to the privilege determinant module 204. In one embodiment, the privilege determinant module 204 may be configured to determine access privileges that may be associated with the user(s) 108 to access watercraft operational data associated with one or more of the remote monitoring categories.

In particular, the access privileges (e.g., provided by the owner(s) of the watercraft 102) may allow the user(s) 108 to access watercraft operational data associated with one or more of the remote monitoring categories, to remotely enable, disable, and/or adjust settings of one or more components of the watercraft 102, to manipulate one or more user interfaces of the application 106, and/or to utilize the watercraft 102 in one or more manners. In one embodiment, the privilege determinant module 204 may be configured to access the storage unit 116 and retrieve a user record(s) associated with the user(s) 108 logged into the application 106 from the user data log 126.

In an exemplary embodiment, upon retrieving a user record(s) associated with the user(s) 108 logged into the application 106 from the user data log 126, the privilege determinant module 204 may further query the user record(s) to retrieve the access privileges associated with the respective user(s) 108. The privilege determinant module 204 may thereby analyze the access privileges and communicate with the interface presentation module 206 of the marine connection application 106 to present a home user interface that may enable the user(s) 108 to view one or more user interfaces that may be associated with one or more types of remote monitoring categories and/or remote commands associated with the watercraft 102.

Figure 5:
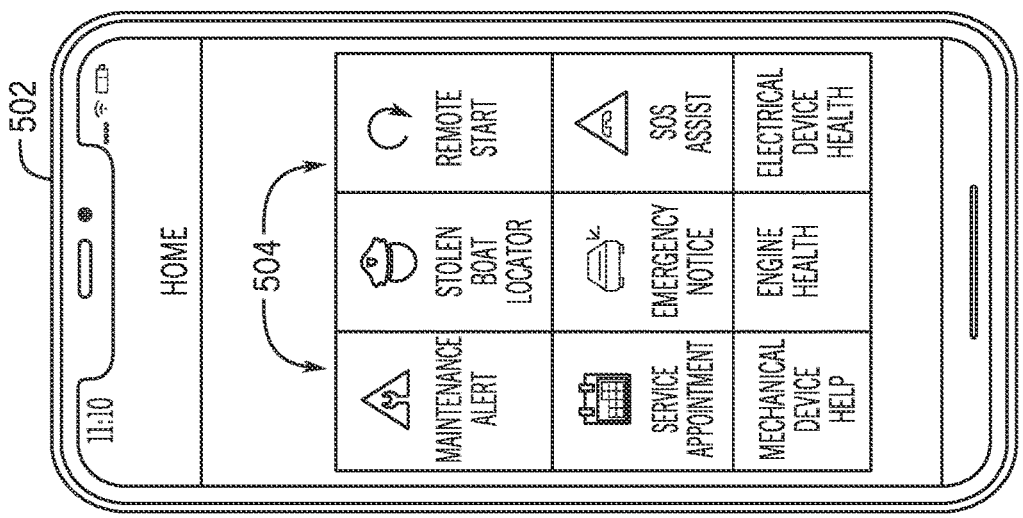
FIG. 5 is an illustrative example of a home user interface of the of the marine connection application according to an exemplary embodiment of the present disclosure.

As shown in an illustrative example of FIG. 5, the home user interface 502 may include one or more user selectable interface input icons 504 that may be associated with one or more respective remote monitoring categories and/or remote commands may be selectively presented based on the access privileges of the user(s) 108. The one or more user selectable interface input icons 504 may be inputted to view one or more respective user interfaces that may be presented based on the selection of the user(s) 108.

Referring again to the method 300 of FIG. 3, the method 300 may proceed to block 306, wherein the method 300 may include presenting one or more user interfaces that include watercraft operational data associated with one or more types of remote monitoring categories based on user selection. In an exemplary embodiment, upon presenting the home user interface, the interface presentation module 206 may determine one or more inputs that may be received by the user(s) 108 upon one or more of the user selectable interface input icons to retrieve watercraft operational data associated with one or more types of remote monitoring categories.

The one or more user interfaces of the marine connection application 106 may present various types of watercraft operational data that includes, but may not be limited to, GPS tracking data, geo-fencing data, engine metrics data, engine diagnostics data, health report data, notification data, speed alert data, depth alert data, battery voltage monitoring data, fuel level and consumption data, intrusion detection data, security system data, binge monitoring data, trip detail data, trip route data, service log data, service scheduling data, weather alert data, shore power data, temperature data, power surge monitoring data, preferred dealer list data, Wi-Fi connectivity data, cellular connectivity data, Bluetooth connectivity data, fleet management data, unit charge from NMEA network data, critical asset monitoring data, service dealer locational data, service dealer promotional data, various types of sensor data, various types of system data, various types of sub-system data, various types of component data, and the like. Some non-limiting illustrative examples of one or more of the user interfaces that may present the watercraft operational data associated with one or more types of remote monitoring categories will now be discussed. However, it is appreciated that various additional types and configurations of user interfaces may be presented by the interface presentation module 206 of the marine connection application 106 which may not be specifically disclosed and/or illustrated herein.

Figure 6:
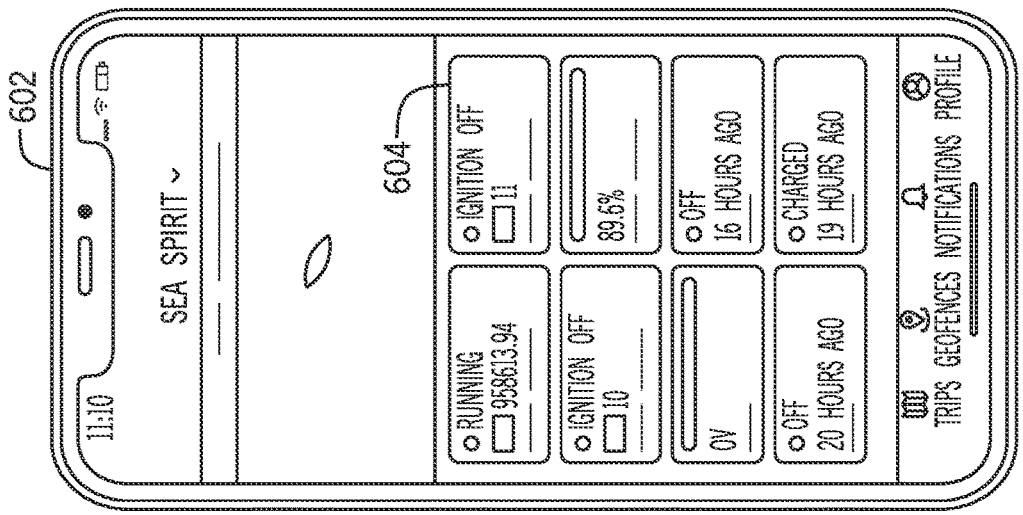
FIG. 6 is an illustrative example of a dashboard user interface of the marine connection application according to an exemplary embodiment of the present disclosure.

With reference to FIG. 6, in one embodiment, based on the receipt of a respective user input from the user(s) 108 via the home user interface, the interface presentation module 206 may be configured to present a dashboard user interface 602. As shown in the illustrative example of FIG. 6, the dashboard user interface 602 may present an overview of watercraft operational data associated with one or more types of remote monitoring categories. In some embodiments, the dashboard user interface 602 may be customized to present alternate watercraft operational data associated with one or more alternate types of remote monitoring categories based on one or more inputs that may be received by the user(s) 108.

In one configuration, the overview of watercraft operational data associated with one or more types of remote monitoring categories may be presented in the form of user interface input tiles, similar to the user interface input tile 604 shown in FIG. 6. The user interface input tiles may be inputted by the user(s) 108 to view one or more respective user interfaces that may specifically pertain to one or more remote monitoring categories. The user interface input tiles may also be presented with one or more graphics/text that may provide watercraft operational data that may be associated with the one or more remote monitoring categories. As an illustrative example, the user interface input tile 604 may be inputted to view a user interface that may present data associated with "engine 2" of the watercraft 102 and/or may enable the user(s) 108 to remotely enable the ignition of "engine 2."

Figure 7B:
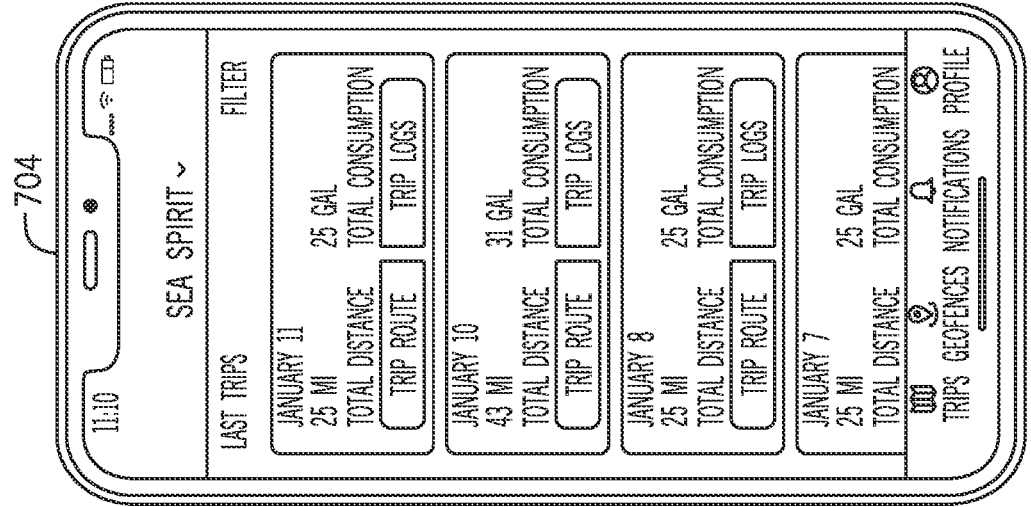
FIG. 7B is an illustrative example of another trip log user interface of the marine connection application according to an exemplary embodiment of the present disclosure.
Figure 7A:
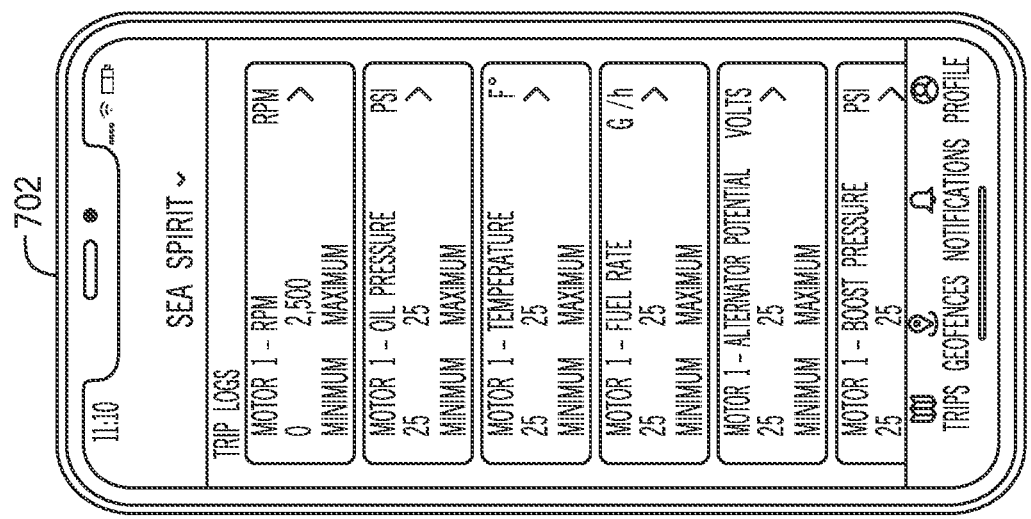
FIG. 7A is an illustrative example of a trip log user interface of the marine connection application according to an exemplary embodiment of the present disclosure.

With reference to FIG. 7A, in one embodiment, based on the receipt of a respective user input from the user(s) 108 via the home user interface 502, the interface presentation module 206 may be configured to present a trip log user interface 702. The trip log user interface 702 may be presented as a user interface list that may include historical watercraft operational data associated with one or more types of remote monitoring categories. In one embodiment, the marine connection application 106 may be configured to populate the user interface list of the trip log user interface 702 by querying the sensor data log 124 stored on the storage unit 116. In particular, the interface presentation module 206 may be configured to access and query the sensor data log 124 to retrieve sensor data points that may be logged within the sensor data log 124. The interface presentation module 206 may thereby present sensor data points through the trip log user interface 702. In some embodiments, the trip log user interface 702 may be customized to present alternate watercraft operational data associated with one or more alternate types of remote monitoring categories based on one or more inputs that may be received by the user(s) 108.

In another embodiment, with reference to FIG. 7B, based on the receipt of a respective user input from the user(s) 108 via the home user interface 502, the marine connection application 106 may be configured to present a trip log user interface 704 that may be presented as a user interface list that may include historical trip data. In particular, the interface presentation module 206 may be configured to access and query the sensor data log 124 to retrieve tracked data that may be associated with one or more prior geo-locations of the watercraft 102. The tracked data may thereby be presented through the trip log user interface 704 as historical trip data. The trip log user interface 704 may be customized to present alternate watercraft operational data associated with one or more alternate types of remote monitoring categories based on one or more inputs that may be received by the user(s) 108.

In one or more embodiments, the interface presentation module 206 may be configured to present a trip planning user interface (not shown) that may be associated with the trip log user interface 702, 704 and/or associated with one or more third-party application (not shown). The trip planning user interface may allow the user(s) 108 to receive recommendations as to one or more popular trip suggestions, point of interest location suggestions, and/or route suggestions that may be based on user inputted searches, the current geo-location of the watercraft 102, and/or a trip plan that may be populated by the user(s) 108 and associated with the watercraft 102. The trip plan may include a plan of one or more locations (e.g., geo-locations, waypoints, ports, cities, etc.) that may be included as future travel routes/destinations of the watercraft 102.

In one embodiment, the trip planning user interface may enable the user(s) 108 to add one or more past trips and/or destinations from the trip log as favorite trips and/or favorite points of interest that were previously visited through the watercraft 102 that may be accessed at one or more points in time to allow the user(s) 108 to view and/or possibly re-follow and/or re-visit. In some embodiments, data associated with the favorite trips and/or favorite points of interest within the user data log 126.

In some embodiments, the trip planning user interface may link to one or more internet and/or social media platforms to present information that may be associated with one or more past, present, and future trips and/or destinations. The trip planning user interface may allow the user(s) 108 to input and/or view a user customized and/or suggested itinerary that may be associated with one or more travel routes, point of interest locations, and the like. The trip planning user interface may also provide a social media component that may allow the user(s) 108 to add content to be shared through one or more social media platforms and/or messaging platforms. Such content may include, but may not be limited to, sharing of trip information, sharing of pictures, sharing of stories (e.g., audio, video, images), sharing of trip routes, sharing of point of interest location information, sharing of customized messages, sharing of popular trip suggestions, sharing of select watercraft operational data, sharing of select trip log data, and the like. For example, the trip planning user interface may provide a social media applet that provides an interface to a particular social media application that may be utilized to share trip information, trip route details, pictures, stories, watercraft related data, and/or customized messages.

Figure 8B:
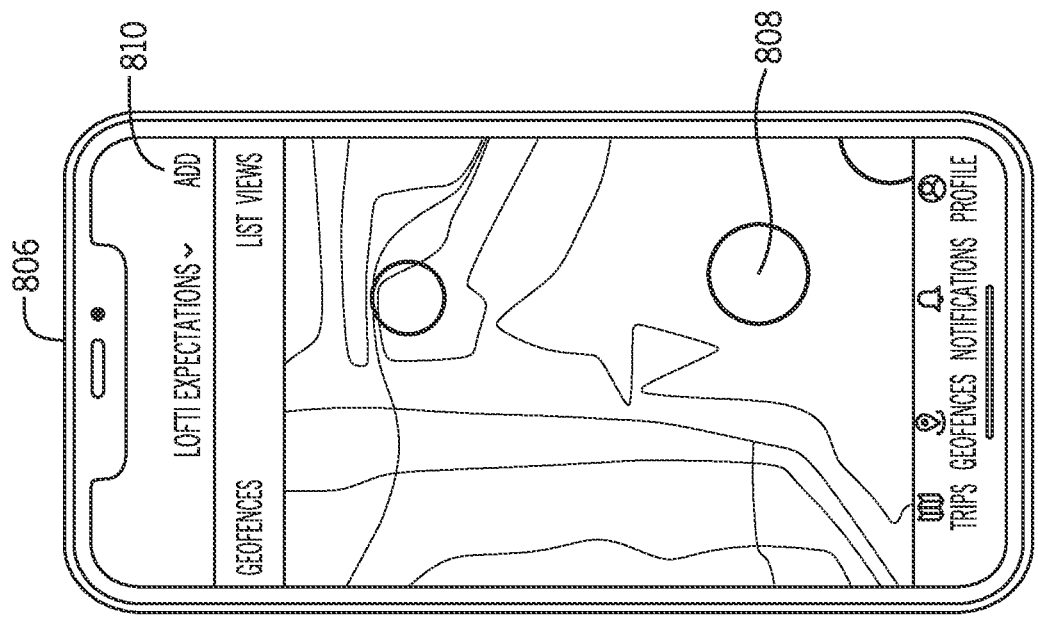
FIG. 8B is an illustrative example of another map user interface of the marine connection application according to an exemplary embodiment of the present disclosure.
Figure 8A:
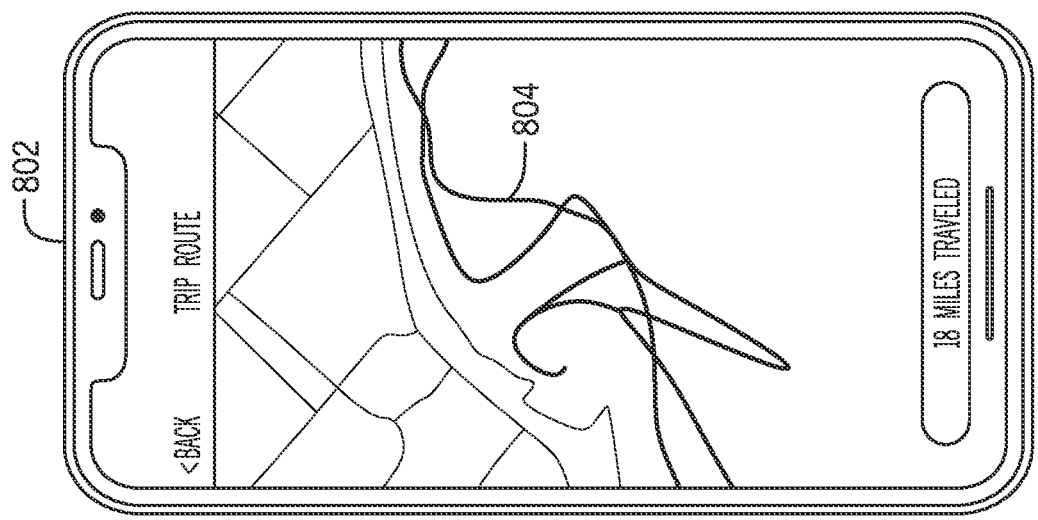
FIG. 8A is an illustrative example of a map user interface of the marine connection application according to an exemplary embodiment of the present disclosure.

With reference to FIG. 8A, in one embodiment, based on the receipt of a respective user input from the user(s) 108 via the home user interface 502, the marine connection application 106 may be configured to present a map user interface 802 that may present one or more prior geo-locations of the watercraft 102 and/or a current geo-locations of the watercraft 102. In particular, the map user interface 802 may be presented with a trip route indication 804 that may present a travel path of the watercraft 102 during a user selectable period of time.

In one embodiment, the interface presentation module 206 may be configured to present the trip route indication 804 upon accessing and querying the sensor data log 124 to retrieve sensor data points associated with one or more prior geo-locations of the watercraft 102 that may be logged within the sensor data log 124. Additionally, the interface presentation module 206 may be configured to communicate with the geo-location sensors 120 to determine and present data associated with the current geo-location of the watercraft 102 through the map user interface 802. In some embodiments, the trip route indication 804 may be selected to be added as a favorite trip and/or shared through one or more social media platforms and/or messaging platforms.

With reference to FIG. 8B, based on the receipt of a respective user input from the user(s) 108 via the home user interface 502, the interface presentation module 206 may be configured to present a map user interface 806 that may present one or more geo-fence locations that may be located within a surrounding environment of the watercraft 102 (e.g., predetermined number of miles surrounding the watercraft 102). The one or more geo-fence locations may be presented as geo-fence indications, similar to the geo-fence indication 808 that may be presented upon respective locations on the map user interface 806. In some configurations, the one or more geo-fence locations may also be presented as a user interface list that may include user interface input tiles that may be associated with respective geo-fence locations. The geo-fence indications and/or user interface input tiles may be inputted by the user(s) 108 to determine specific information (e.g., geo-locational coordinates, geo-location name) pertaining to one more respective geo-locations.

In some configurations, the map user interfaces 802, 806 may be presented in various levels, scales, sizes, and may present various mapping data points (e.g., bodies of water, regions, cities, states, local landmarks, points of interest, etc.) based on selection of the user(s) 108. For example, the map user interfaces 802, 806 may allow the user(s) 108 to zoom-in or zoom-out using one or more types of inputs (e.g., keyboard inputs, pinching touch-gestures) to present the map user interfaces 802, 806 in one or more levels, scales, and/or sizes.

In one or more embodiments, the map user interface 806 may additionally be utilized by the user(s) 108 to add one or more geo-fence locations to alert the user(s) 108 when the watercraft 102 enters and/or leaves one or more geo-fence locations. As shown in the illustrative example of FIG. 8B, the map user interface 806 may include an add user interface input link 810 that may be inputted by the user(s) 108 to add one or more geo-fence locations through the map user interface 806. In one configuration, the one or more geo-fence locations may be added using one or more types of inputs (e.g., keyboard inputs, touch-inputs) and may be presented as respective geo-fence indications (similar to the geo-fence indication 608) upon being added.

In additional embodiments, the map user interface 806 may present one or more locations that may be determined as high-risk locations. Such high-risk locations that may include locations that include low depth, rocky surfaces, high waves, high winds, high watercraft traffic, inclement weather, and/or additional factors that may present a high-risk to the safe operation of the watercraft 102.

Figures 8C, 8D:
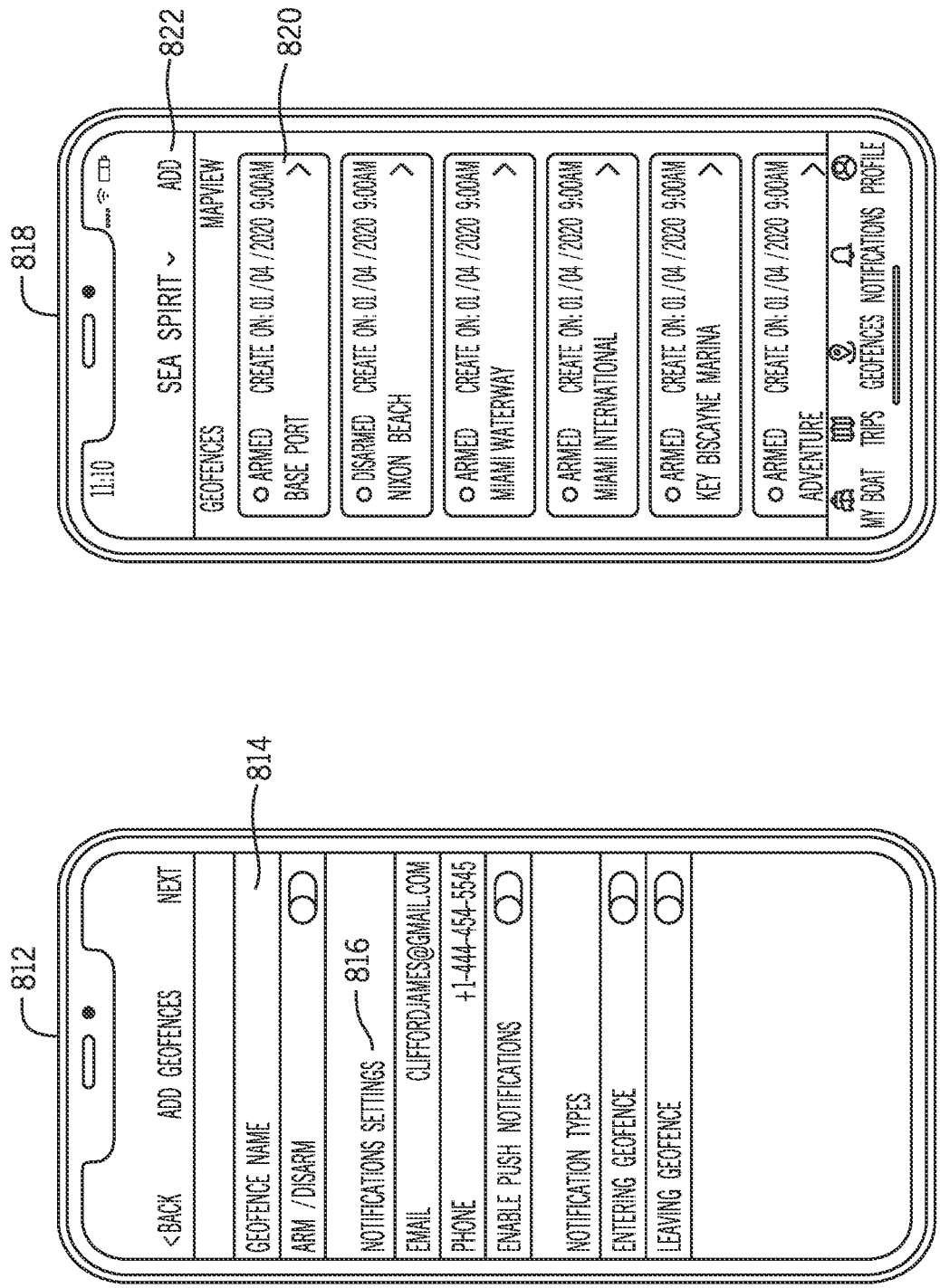
FIG. 8C is an illustrative example of a geo-fence addition user interface of the marine connection application according to an exemplary embodiment of the present disclosure.
FIG. 8D is an illustrative example of a geo-fence user interface list interface of the marine connection application according to an exemplary embodiment of the present disclosure.

In one configuration, as shown in FIG. 8C, upon adding one or more geo-fence locations, the user(s) 108 may be presented with a geo-fence addition user interface 812 that may enable the user(s) 108 to add a name 814 of the newly added geo-fences. The geo-fence addition user interface 812 may additionally allow the user(s) 108 to add notification settings 816 to selectively notify the user(s) 108 if the watercraft 102 enters one or more geo-fence locations and/or leaves one or more geo-fence locations. Accordingly, the interface presentation module 206 may present one or more geo-fence notifications upon communicating with the geo-location sensors 120 and determining that the watercraft 102 enters and/or leaves one or more respective geo-fence locations.

As shown in FIG. 8D, the interface presentation module 206 may selectively present the user(s) 108 with a geo-fence user interface list interface 818 that provides a list of geo-fences previously added to selectively notify the user(s) 108 if the watercraft 102 enters one or more geo-fence locations and/or leaves one or more geo-fence locations. The geo-fence user interface list interface 818 may include geo-fence user interface icons, similar to the geo-fence user interface icon 820 that may provide an armed status of a notification setting associated with each particular geo-fence location. The geo-fence user interface icons may each be selectively inputted to provide additional details that may be associated with each respective geo-fence location. As shown in the illustrative example of FIG. 8D, the geo-fence user interface list interface 818 may include an add user interface icon 822 that may be inputted. Upon receiving an input of the add user interface icon 822, the map user interface 806 may be presented to the user(s) 108 to be utilized to add one or more additional geo-fence locations to alert the user(s) 108 when the watercraft 102 enters and/or leaves one or more geo-fence locations.

Figure 9C:
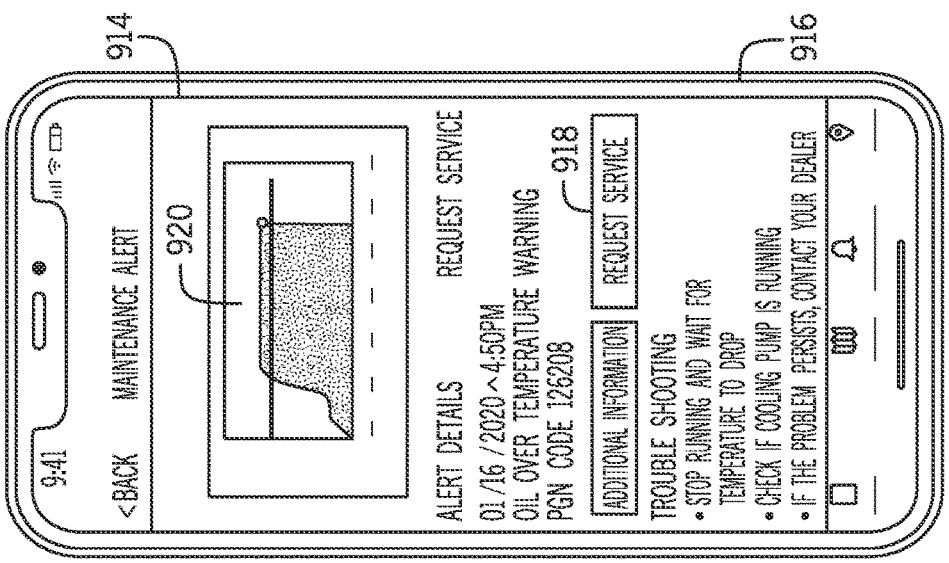
FIG. 9C is an illustrative example of a maintenance alert user interface of the marine connection application according to an exemplary embodiment of the present disclosure.
Figure 9B:
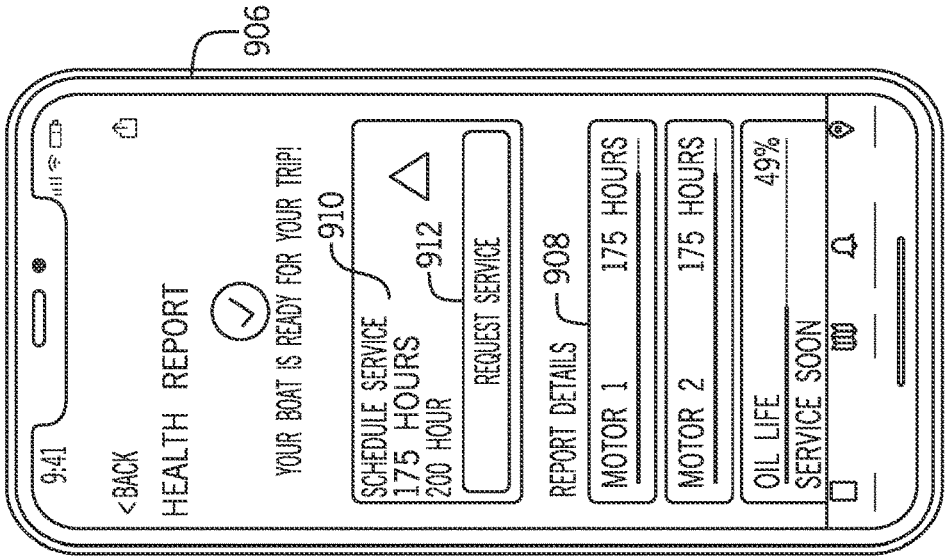
FIG. 9B is an illustrative example of another health user interface of the marine connection application according to an exemplary embodiment of the present disclosure.
Figure 9A:
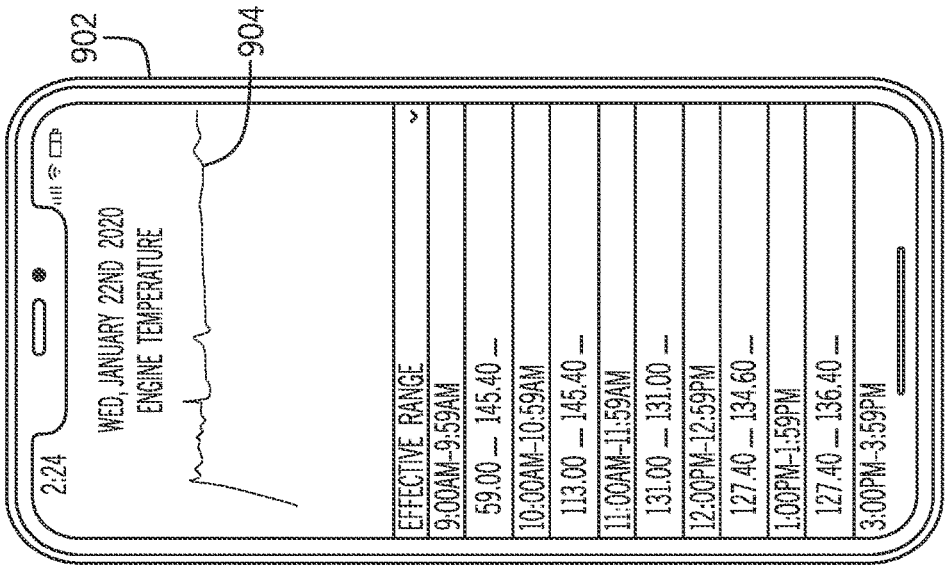
FIG. 9A is an illustrative example of a health user interface of the marine connection application according to an exemplary embodiment of the present disclosure.

With reference to FIG. 9A, in one embodiment, based on the receipt of a respective user input from the user(s) 108 via the home user interface 502, the interface presentation module 206 may be configured to present a health report user interface 902. The health report user interface 902 may be presented as a user interface list that may include historical data and/or current data associated with one or more components of the watercraft 102 (e.g., mechanical components such as engines, electrical components such as the batteries).

In one embodiment, the marine connection application 106 may be configured to populate a user interface list of the health report user interface 902 by querying the sensor data log 124 stored on the storage unit 116. In particular, the application 106 may be configured to access and query the sensor data log 124 to retrieve sensor data points that may be provided by the mechanical/electrical sensors 118 that may be logged within the sensor data log 124. Such sensor data points may thereby be presented by the interface presentation module 206 through the health report user interface 902.

In some embodiment, the health report user interface 902 may present one or more graphs that may be associated with particular sensor data points. For example, as shown, the health report user interface 902 may present a graph 904 that may be associated with temperature and/or operating range of one or more engines of the watercraft 102 for a selectable period of time. In some embodiments, the health report user interface 902 may be customized to present the user interface list and/or one or more graphs with alternate watercraft operational data associated with one or more alternate types of remote monitoring categories based on one or more inputs that may be received by the user(s) 108.

With reference to FIG. 9B, the interface presentation module 206 may be configured to present a health report user interface 906 in one or more graphical formats. As shown, the health report user interface 906 may be presented to include a user interface list 708 that may include historical data and/or current data associated with one or more components of the watercraft 102. The health report user interface 906 may include report details 908 that pertain to various mechanical, electrical, and/or maintenance related details associated with the watercraft 102. The health report user interface 906 may additionally include a service scheduling reminder 910 that may be provided to the user(s) 108 through the portable device 110 and/or one or more external computing platforms 112 to alert the user(s) 108 of an upcoming service timeframe. In some embodiments, the health report user interface 906 may also include a request service user interface input icon 912 that may enable the user(s) 108 to request service of the watercraft 102 through one or more preferred service dealers and/or one or more service dealers that may be located within a predetermined distance from the current geo-location of the watercraft 102.

With reference to FIG. 9C, in one embodiment, the marine connection application 106 may be configured to present a maintenance alert user interface 914 that may be presented to alert the user(s) 108 of one or more notifications warnings. In particular, the maintenance alert user interface 914 may be provided to the user(s) 108 based on data that may be provided by mechanical/electrical sensors 118, geo-location sensors 120, and/or dynamic sensors 122 of the watercraft 102 that may indicate a scheduled maintenance of one or more components, a required maintenance of one or more components, an error code, a warning level of the notification, an urgency of the notification, an enablement status associated with a component(s) of the watercraft 102, a disablement status associated with a component(s) of the watercraft 102, an open status associated with a component(s) of the watercraft 102, a close status associated with a component(s) of the watercraft 102, and the like.

As shown, the maintenance alert user interface 914 may include troubleshooting recommendations 916 that may be provided to the user(s) 108 to assist in trouble-shooting one or more possible issues. The maintenance alert user interface 914 may also include a request service user interface input icon 918 that may enable the user(s) 108 to request service of the watercraft 102 through one or more preferred service dealers and/or one or more service dealers that may be located within a predetermined distance from the current geo-location of the watercraft 102. The maintenance alert user interface 914 may additionally present a graph 920 and/or additional/alternate graphics that may present historical data that may be associated with one or more components and that may be derived from the sensor data log 124.

Figures 10A, 10B, 10C:
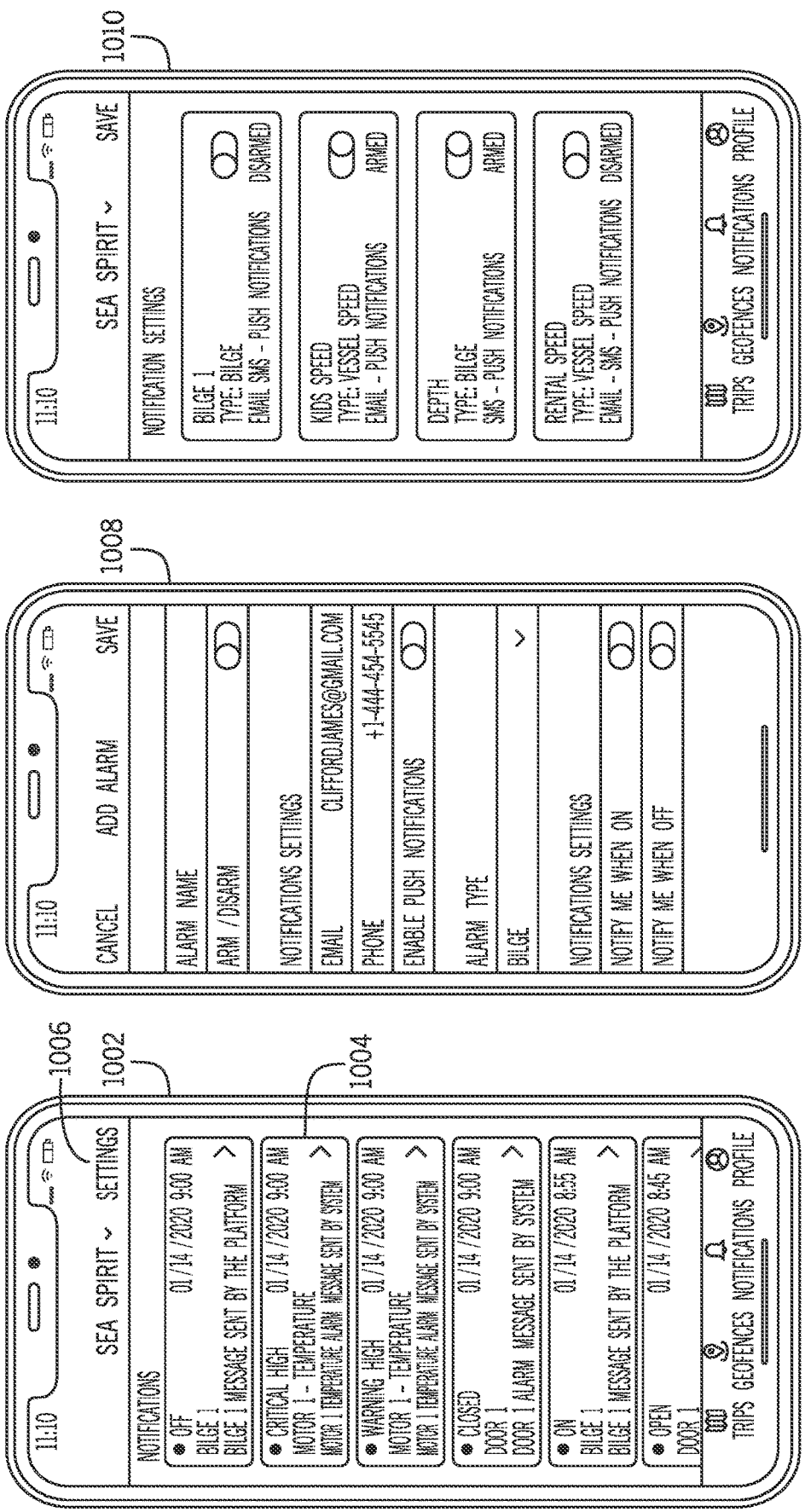
FIG. 10A is an illustrative example of a notification list user interface of the marine connection application according to an exemplary embodiment of the present disclosure.
FIG. 10B is an illustrative example of a notification settings user interface of the marine connection application according to an exemplary embodiment of the present disclosure.
FIG. 10C is an illustrative example of a notification user interface list interface of the marine connection application according to an exemplary embodiment of the present disclosure.

The interface presentation module 206 may be configured to communicate one or more alerts/notifications based on sensed data (e.g., sensor readings, errors) provided by the mechanical/electrical sensors 118, the geo-location sensors 120, and/or the dynamic sensors 122 that may be provided by the interface presentation module 206 through one or more additional and/or alternate user interfaces (e.g., in the form of error codes, user interface alerts). With reference to FIG. 10A, in one embodiment, the marine connection application 106 may be configured to present a notification list user interface 1002 that may include a user interface list of notifications that may be associated with sensed data. Each of the notifications including on the notification list user interface 1002 may be presented in the form of user interface input tiles, similar to the user interface input tile 1004 shown in FIG. 10A.

The user interface input tiles may include a summary of information pertaining to each of the notifications including, but not limited to, a scheduled maintenance of one or more components, a required maintenance of one or more components, a type of notification, an error code, a warning level of the notification, an urgency of the notification, an enablement status associated with a component(s) of the watercraft 102, a disablement status associated with a component(s) of the watercraft 102, an open status associated with a component(s) of the watercraft 102, a close status associated with a component(s) of the watercraft 102, a weather update, a geo-fence alert, a license/registration/insurance renewal alert, a motion sensor alert, a security system alert, a fuel level alert, a battery charge level alert, a speed alert, a depth alert, a security system alert, a power surge monitoring alert, and the like. The user interface input tiles may be inputted by the user(s) 108 to view one or more respective user interfaces that may specifically pertain to one or more remote notifications that may be presented within the respective tiles. For example, the user interface input tile 1004 may be inputted to view a user interface that may present specific data associated with a temperature notification associated with "Motor 1,"

Additionally, as shown in FIG. 10A, the notification list user interface 1002 may be presented with a settings user interface input icon 1006. The settings user interface input icon 1006 may be inputted by the user(s) 108 to add, remove, and/or edit one or more notifications that are to be presented to the user(s) 108 though the notification list user interface 1002, pop-up notification alerts (not shown), e-mail notifications (not shown), SMS text message notifications (not shown), and the like.

Based on the receipt of a respective user input from the user(s) 108 upon the settings user interface input icon 1006, the interface presentation module 206 may be configured to present a notification settings user interface 1008, shown in FIG. 10B that may enable the user(s) 108 to add one or more notifications that may be associated with one or more types of remote monitoring categories. The notification settings user interface 1008 may enable the user(s) 108 to input a respective notification name, type of notification alert, and/or select types of notifications (e.g., user interface notification list, push notifications, pop-up notifications, e-mail notifications, SMS text notifications, etc.)

In one embodiment, the interface presentation module 206 may be configured to present a notification user interface list interface 1010, as shown in FIG. 10C. The notification user interface list interface 1010 may allow the user(s) 108 to add notification settings to selectively arm or disarm settings notifications and/or provide notifications for various component status changes (e.g., enablement, disablement, open, close, etc.). Accordingly, the interface presentation module 206 may present one or more notifications in one or more manners based on the notification settings selected by the user(s) 108 through the notification settings user interface 1008 and/or the notification user interface list interface 1010.

With reference to FIG. 11A, in one or more embodiments, the interface presentation module 206 may be configured to present a service request user interface 1102 that may be presented to the user(s) 108 upon the presentation of one or more notifications and/or based on the receipt of a respective user input from the user(s) 108 via the home user interface 502. In one configuration, the service request user interface may be configured to present a user interface list 1104 and/or a map user interface 1106 of one or more service dealers (e.g., repair service shop/garage) that may be located within a particular location (e.g., region located within a predetermined distance of the watercraft 102). In some embodiments, the service request user interface may be populated with information that pertains to one or more service dealers based on a query of the user data log 126 that may include user records and/or third-party records associated with one or more service dealers. In additional embodiments, the service request user interface may be populated with information that pertains one or more service dealers based on an internet search query that may be completed by the marine connection application 106.

In one embodiment, the user interface list 1104 may include user interface icons similar to the user interface icon 1108 that pertain to a respective service dealers (e.g., repair service shop/garage) that may be located within a particular location. Each of the user interface icons may be selected to provide further detailed information associated with the respective service dealer through a presentation of a service dealer information interface 1110, shown in FIG. 11B. As shown in the illustrative example of FIG. 11B, the service dealer information interface 1110 may include details associated with the respective service dealer. Such details may include the service dealer's address, phone number, and a list of services that may be provided by a particular service dealer. For example, if the user(s) 108 inputs the user interface icon 1108 upon the user interface list 1104 of the service request user interface 1102, the interface presentation module 206 may present the service dealer information interface 1110 associated with the respective service dealer to provide the user(s) 108 with the service dealer's contact information (e.g., address, phone number, website address, e-mail) and a list of services that may be provided by the service dealer. As shown in FIG. 11B, the service dealer information interface 1110 may be presented with a call user interface icon 1112 that may be inputted to initiate a phone call to the service dealer. The service dealer information interface 1110 may also be presented with a schedule service user interface icon 1114 that may be inputted to allow the user(s) 108 to schedule a particular service with the service dealer.

In an exemplary embodiment, upon receiving a user input upon the schedule service user interface icon 1114 of the service dealer information interface 1110, the interface presentation module 206 may be configured to present a schedule service user interface 1116, as shown in FIG. 11C. In one embodiment, the schedule service user interface 1116 may enable the user(s) 108 to input information associated with the user(s) 108 and the watercraft 102. In some embodiments, the interface presentation module 206 may be configured to communicate with the mechanical/electrical sensors 118, the geo-location sensors 120, and/or the dynamic sensors 122 to populate watercraft operational data and/or alerts/notifications associated with the watercraft 102 to the schedule service user interface 1116. In additional configurations, the interface presentation module 206 may be configured to access the sensor data log 124 and/or the user data log 126 to populate watercraft operational data, alerts/notifications associated with the watercraft 102, and/or user information to the schedule service user interface 1116. Upon input of a submit user interface input button 1118, the data inputted and/or populated to the schedule service user interface 1116 may be communicated to the respective service dealer to schedule a particular service request.

Referring again to FIG. 11A, in some embodiments, the service request user interface 1102 may allow the user(s) 108 to select one or more preferred service dealers to be added to the user data log 126. The one or more preferred service dealers may be provided with privileges to obtain watercraft operational data, receive alerts/notifications associated with the watercraft 102, and/or update settings associated with one or more components of the watercraft 102. In one or more embodiments, the interface presentation module 206 may be configured to present one or more service dealer promotions, benefits, and/or coupons to the user(s) 108 through the service request user interface, one or more notification/alert user interfaces, and/or service scheduling user interfaces of the marine connection application 106. The one or more service dealer promotions, benefits, and/or coupons may be communicated to the interface presentation module 206 to be presented to the user(s) 108 based on service dealer(s) accessing and uploading such promotions, benefits, and/or coupons through one or more external computing platforms 112.

It is to be appreciated that additional service providers and/or merchants may also communicate promotions, benefits, and/or coupons that may be selectively presented to the user(s) 108 through one or more user interfaces of the application 106. In one embodiment, the interface presentation module 206 may be configured to present an assistance request user interface (not shown) that may be presented to the user(s) 108 upon the presentation of one or more notifications and/or based on the receipt of a respective user input from the user(s) 108 via the home user interface. The assistance request user interface may be configured to present a service request user interface icon that may be inputted to enable the application 106 to send one or more alert notifications to one or more service dealers (e.g., preferred service dealers pre-updated by the user(s) 108 within the user data log 126), one or more emergency agencies (e.g., police, fire, EMS, coast guard).

In some embodiments, the assistance request user interface may additionally include a SOS user interface input icon (not shown) that may be inputted to request immediate assistance to one or more additional watercraft and/or additional entities (e.g., coast guard). In additional embodiments, the assistance request user interface may include location tracking functionality that may allow the user(s) 108 to quickly determine the current geo-location of the watercraft 102 (e.g., find my boat feature), determine a past track and/or projected track of the watercraft 102, and/or receive image data, motion sensing data, door opening/closing data associated with the watercraft 102. Such functionality may assist the user(s) 108 in a circumstance in which the watercraft 102 is lost, stolen, and/or utilized without permission.

In some embodiments, the interface presentation module 206 may be configured to provide the one or more user interfaces that present external third-party content in an easy to use intuitive fashion to enable the user(s) 108 to easily navigate through the content while on-board the watercraft 102. In some embodiments, the one or more user interfaces may also be configured to present one or more third-party applications that may be utilized by the user(s) 108 while on-board the watercraft 102 or off-board from the watercraft 102. Such third-party applications may include, but may not be limited to, video streaming applications, live television applications, music streaming applications, social media applications, power monitoring applications, security system applications, navigational applications, satellite radio applications, media applications, government agency applications, and the like.

Figure 12:
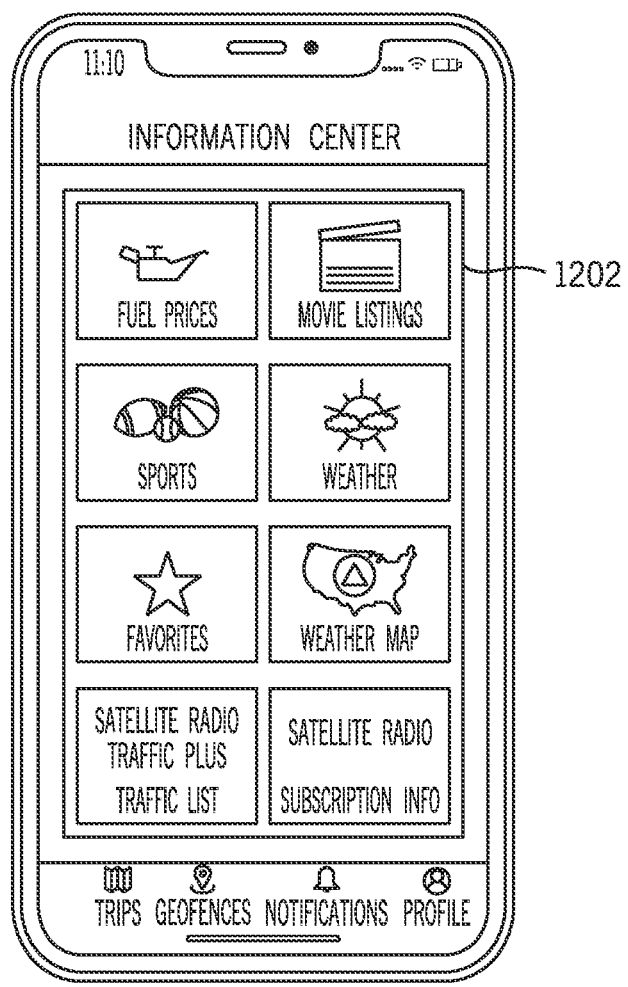
FIG. 12 is an illustrative example of a third-party information interface of the marine connection application according to an exemplary embodiment of the present disclosure.

As shown in the illustrative example of FIG. 12, the interface presentation module 206 may present a third-party information interface 1202 that may be presented in an interactive manner to present the user(s) 108 with third-party content that may be utilized onboard the watercraft 102 and/or off-board the watercraft 102. The third-party information interface 1202 may present one or more types of information through one or more display units (not shown) of the watercraft 102, the portable device 110, and/or the external computing platform(s) 112. Such information may include, but may not be limited to, mapping content, news content, weather content, sports content, entertainment content, audio content, point of interest content, pricing content, satellite radio content, and the like.

Figure 13:
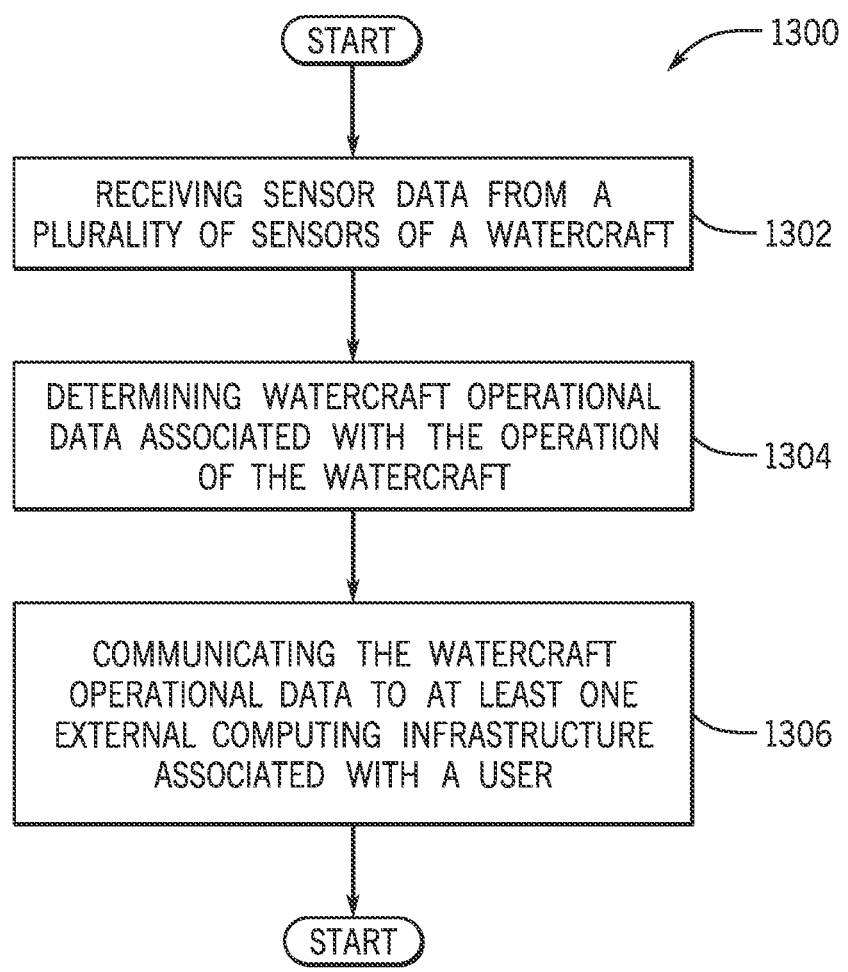
FIG. 13 is a process flow diagram of a method for providing marine connectivity according to an exemplary embodiment of the present disclosure.

FIG. 13 is a process flow diagram of a method 1300 for providing marine connectivity according to an exemplary embodiment of the present disclosure. FIG. 13 will be described with reference to the components of FIG. 1, though it is to be appreciated that the method of FIG. 13 may be used with other systems/components. The method 1300 may begin at block 1302, wherein the method 1300 may include receiving sensor data from a plurality of sensors of a watercraft 102.

The method 1300 may proceed to block 1304, wherein the method 1300 may include determining watercraft operational data associated with the operation of the watercraft 102. The method 1300 may proceed to block 1306, wherein the method 1300 may include communicating the watercraft operational data to at least one external computing infrastructure associated with a user 108. In an exemplary embodiment, the watercraft operational data is communicated through various types of graphical user interfaces.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented sin any method or technology for storage of information such as computer readable instructions, data structures, modules or other data. Non-transitory computer readable storage media excludes transitory and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for providing marine connectivity, comprising:
receiving sensor data from a plurality of sensors of a watercraft;
determining watercraft operational data associated with an operation of the watercraft, wherein the operation of the watercraft includes at least one of: an operation of mechanical components of the watercraft, an operation of electrical components of the watercraft, and a dynamic operation of the watercraft; and
communicating the watercraft operational data to at least one external computing infrastructure associated with a user, wherein the watercraft operational data is communicated through a plurality of graphical user interfaces, wherein the plurality of graphical user interfaces enable the user to customize settings comprising graphical layout customization settings, notification type settings, notification presentation frequency settings, and watercraft operational data displays for remote monitoring categories associated with the watercraft, wherein the remote monitoring categories comprise the operation of the watercraft, geo-locations of the watercraft, financial data associated with the watercraft, and safety related data associated with the operation of the watercraft.

2. The computer-implemented method of claim 1, wherein the user includes at least one of: an owner of the watercraft, a party who leases the watercraft, an operator of the watercraft, a party who maintains the watercraft, a party who stores the watercraft, a manufacturer of the watercraft, a manufacturer of at least one component of the watercraft, and an agency.

3. The computer-implemented method of claim 1, wherein receiving sensor data from the plurality of sensors includes receiving sensor data from at least one of: mechanical/electrical sensors, geo-location sensors, and dynamic sensors, wherein the sensor data is stored onto a sensor data log, wherein the sensor data log stores data points that are utilized to provide tracked data that is tracked for at least one period of time.

4. The computer-implemented method of claim 3, wherein determining the watercraft operational data includes determining watercraft operational data from the sensor data for at least one remote monitoring category, wherein the at least remote monitoring category includes at least one of: daily operation of the watercraft, the geo-locations of the watercraft, electronic/mechanical data associated with components of the watercraft, the safety related data associated with an operation of the watercraft.

5. The computer-implemented method of claim 4, wherein communicating the watercraft operational data includes presenting a dashboard user interface that includes an overview of the watercraft operational data and a user interface input tile that selectively allows the user to remotely enable at least one engine of the watercraft, wherein the watercraft operational data is presented in the form of user interface input tiles that pertain to the at least one remote monitoring category to be inputted to view at least one user interface that specifically pertains to the at least one remote monitoring category.

6. The computer-implemented method of claim 4, wherein communicating the watercraft operational data includes presenting a trip log user interface that includes a user interface list that includes historical watercraft operational data associated with the at least remote monitoring category, wherein the historical watercraft operational data is based on the tracked data retrieved from the sensor data log.

7. The computer-implemented method of claim 4, wherein communicating the watercraft operational data includes presenting a map user interface, wherein the map user interface presents prior geo-locations of the watercraft, a current geo-location of the watercraft, at least one location that presents a high-risk to a safe operation of the watercraft, and an add user interface input link that enables the user to add at least one geo-fence location through the map user interface, wherein the prior geo-locations of the watercraft are based on the tracked data retrieved from the sensor data log and the current geo-location of the watercraft is communicated by the geo-location sensors.

8. The computer-implemented method of claim 4, wherein communicating the watercraft operational data includes presenting a health report user interface, wherein the health report user interface presents historical data and current data associated with a health of at least one component of the watercraft, wherein the historical data is based on the tracked data retrieved from the sensor data log and the current data is communicated by the mechanical/electrical sensors.

9. The computer-implemented method of claim 4, wherein communicating the watercraft operational data includes presenting a notification list user interface, wherein the notification list user interface includes user interface input tiles that include a summary of information pertaining to notifications that are determined based on the sensor data.

10. A system for providing marine connectivity, comprising:
a memory storing instructions, which, when executed by a processor, cause the processor to:
receive sensor data from a plurality of sensors of a watercraft;
determine watercraft operational data associated with an operation of the watercraft, wherein the operation of the watercraft includes at least one of: an operation of mechanical components of the watercraft, an operation of electrical components of the watercraft, and a dynamic operation of the watercraft; and
communicate the watercraft operational data to at least one external computing infrastructure associated with a user, wherein the watercraft operational data is communicated through a plurality of graphical user interfaces, wherein the plurality of graphical user interfaces enable the user to customize settings comprising graphical layout customization settings, notification type settings, notification presentation frequency settings, and watercraft operational data displays for remote monitoring categories associated with the watercraft, wherein the remote monitoring categories comprise the operation of the watercraft, geo-locations of the watercraft, financial data associated with the watercraft, and safety related data associated with the operation of the watercraft.

11. The system of claim 10, wherein the user includes at least one of:
an owner of the watercraft, a party who leases the watercraft, an operator of the watercraft, a party who maintains the watercraft, a party who stores the watercraft, a manufacturer of the watercraft, a manufacturer of at least one component of the watercraft, and an agency.

12. The system of claim 10, wherein receiving sensor data from the plurality of sensors includes receiving sensor data from at least one of:
mechanical/electrical sensors, geo-location sensors, and dynamic sensors, wherein the sensor data is stored onto a sensor data log, wherein the sensor data log stores data points that are utilized to provide tracked data that is tracked for at least one period of time.

13. The system of claim 12, wherein determining the watercraft operational data includes determining watercraft operational data from the sensor data for at least one remote monitoring category, wherein the at least remote monitoring category includes at least one of: daily operation of the watercraft, the geo-locations of the watercraft, electronic/mechanical data associated with components of the watercraft, the safety related data associated with an operation of the watercraft.

14. The system of claim 13, wherein communicating the watercraft operational data includes presenting a dashboard user interface that includes an overview of the watercraft operational data and a user interface input tile that selectively allows the user to remotely enable at least one engine of the watercraft, wherein the watercraft operational data is presented in the form of user interface input tiles that pertain to the at least one remote monitoring category to be inputted to view at least one user interface that specifically pertains to the at least one remote monitoring category.

15. The system of claim 13, wherein communicating the watercraft operational data includes presenting a trip log user interface that includes a user interface list that includes historical watercraft operational data associated with the at least remote monitoring category, wherein the historical watercraft operational data is based on the tracked data retrieved from the sensor data log.

16. The system of claim 13, wherein communicating the watercraft operational data includes presenting a map user interface, wherein the map user interface presents prior geo-locations of the watercraft, a current geo-location of the watercraft, at least one location that presents a high-risk to a safe operation of the watercraft, and an add user interface input link that enables the user to add at least one geo-fence location through the map user interface, wherein the prior geo-locations of the watercraft are based on the tracked data retrieved from the sensor data log and the current geo-location of the watercraft is communicated by the geo-location sensors.

17. The system of claim 13, wherein communicating the watercraft operational data includes presenting a health report user interface, wherein the health report user interface presents historical data and current data associated with a health of at least one component of the watercraft, wherein the historical data is based on the tracked data retrieved from the sensor data log and the current data is communicated by the mechanical/electrical sensors.

18. The system of claim 13, wherein communicating the watercraft operational data includes presenting a notification list user interface, wherein the notification list user interface includes user interface input tiles that include a summary of information pertaining to notifications that are determined based on the sensor data.

19. A non-transitory computer readable storage medium storing instructions that when executed by a computer, which includes a processor, performs a method, the method comprising:
receiving sensor data from a plurality of sensors of a watercraft;
determining watercraft operational data associated with an operation of the watercraft, wherein the operation of the watercraft includes at least one of: an operation of mechanical components of the watercraft, an operation of electrical components of the watercraft, and a dynamic operation of the watercraft; and
communicating the watercraft operational data to at least one external computing infrastructure associated with a user, wherein the watercraft operational data is communicated through a plurality of graphical user interfaces, wherein the plurality of graphical user interfaces enable the user to customize settings comprising graphical layout customization settings, notification type settings, notification presentation frequency settings, and watercraft operational data displays for remote monitoring categories associated with the watercraft, wherein the remote monitoring categories comprise the operation of the watercraft, geo-locations of the watercraft, financial data associated with the watercraft, and safety related data associated with the operation of the watercraft.

20. The non-transitory computer readable storage medium of claim 19, wherein receiving sensor data from the plurality of sensors includes receiving sensor data from at least one of: mechanical/electrical sensors, geo-location sensors, and dynamic sensors, wherein the sensor data is stored onto a sensor data log, wherein the sensor data log stores data points that are utilized to provide tracked data that is tracked for at least one period of time.

* * * * *